United States Patent
Terui et al.

(10) Patent No.: US 12,187,921 B2
(45) Date of Patent: Jan. 7, 2025

(54) POWDER ADHESIVE AND BONDED ARTICLE

(71) Applicant: CANON KABUSHIKI KAISHA, Tokyo (JP)

(72) Inventors: Yuhei Terui, Shizuoka (JP); Shohei Yamashita, Tokyo (JP); Tsutomu Shimano, Shizuoka (JP); Koji Nishikawa, Shizuoka (JP); Kohei Matsuda, Kanagawa (JP); Yuki Nishizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 483 days.

(21) Appl. No.: 17/385,118

(22) Filed: Jul. 26, 2021

(65) Prior Publication Data

US 2022/0041906 A1    Feb. 10, 2022

(30) Foreign Application Priority Data

Jul. 31, 2020   (JP) .................. 2020-130488

(51) Int. Cl.
*C09J 11/08* (2006.01)
*B32B 7/12* (2006.01)
(Continued)

(52) U.S. Cl.
CPC .............. *C09J 11/08* (2013.01); *B32B 7/12* (2013.01); *B32B 29/005* (2013.01);
(Continued)

(58) Field of Classification Search
None
See application file for complete search history.

(56) References Cited

U.S. PATENT DOCUMENTS 7,260,354 B2   8/2007   Ishida
8,632,934 B2   1/2014   Shirai et al.
(Continued)

FOREIGN PATENT DOCUMENTS

JP   2002-220477 A   8/2002
JP   2004-109602 A   4/2004
(Continued)

OTHER PUBLICATIONS

Notice of Reasons for Refusal in Japanese Application No. 2020-130488 (Apr. 2024).

*Primary Examiner* — Chinessa T. Golden
(74) *Attorney, Agent, or Firm* — Venable LLP

(57) ABSTRACT

The powder adhesive comprises a thermoplastic resin and particles of an aromatic compound, wherein the particles of an aromatic compound are particles of a compound that has an aromatic ring and an azo bond bonded to the aromatic ring, or are particles of a compound comprising a heteroaromatic ring comprising nitrogen atom; the thermoplastic resin comprises an ester group; and, designating Es (mmol/g) as an ester group concentration in the thermoplastic resin, M (mass %) as a content of the aromatic compound particles in the powder adhesive, and N (mmol/g) as a nitrogen atom concentration in the aromatic compound particles, Es is from 1.0 mmol/g to 4.5 mmol/g, M is from $1.0\times10^{-4}$ mass % to $1.0\times10^{0}$ mass %, and N is from 5.0 mmol/g to 15.0 mmol/g.

14 Claims, 3 Drawing Sheets

(51) Int. Cl.

| | |
|---|---|
| *B32B 29/00* | (2006.01) |
| *C08F 212/08* | (2006.01) |
| *C08F 220/18* | (2006.01) |
| *C08K 5/23* | (2006.01) |
| *C08K 5/3417* | (2006.01) |
| *C08K 5/3437* | (2006.01) |
| *C08K 5/3447* | (2006.01) |
| *C09J 5/06* | (2006.01) |
| *C09J 11/06* | (2006.01) |
| *C09J 125/06* | (2006.01) |
| *C09J 133/10* | (2006.01) |
| *D21H 19/42* | (2006.01) |
| *D21H 19/60* | (2006.01) |

(52) U.S. Cl.
CPC ...... *C08F 212/08* (2013.01); *C08F 220/1806* (2020.02); *C08K 5/235* (2013.01); *C08K 5/3417* (2013.01); *C08K 5/3437* (2013.01); *C08K 5/3447* (2013.01); *C09J 5/06* (2013.01); *C09J 11/06* (2013.01); *C09J 125/06* (2013.01); *C09J 133/10* (2013.01); *D21H 19/42* (2013.01); *D21H 19/60* (2013.01); *C08F 2800/20* (2013.01); *C09J 2400/286* (2013.01); *C09J 2425/00* (2013.01); *C09J 2433/00* (2013.01); *C09J 2491/00* (2013.01)

(56) References Cited

U.S. PATENT DOCUMENTS

| | | |
|---|---|---|
| 9,377,705 B2 | 6/2016 | Shimano et al. |
| 9,857,711 B2 | 1/2018 | Yoshida et al. |
| 10,416,582 B2 | 9/2019 | Nakagawa et al. |
| 10,437,165 B2 | 10/2019 | Shimano et al. |
| 10,877,390 B2 | 12/2020 | Shimano et al. |
| 10,982,117 B2 | 4/2021 | Yamasaki et al. |
| 2004/0115553 A1* | 6/2004 | Yamanouchi ...... G03G 9/09725 430/123.51 |
| 2007/0128537 A1* | 6/2007 | Ariyoshi ............. G03G 9/0804 430/137.14 |
| 2010/0167194 A1 | 7/2010 | Jeong et al. |
| 2019/0227449 A1* | 7/2019 | Nemoto ............ G03G 9/08797 |
| 2020/0183294 A1 | 6/2020 | Fukudome et al. |
| 2022/0035261 A1* | 2/2022 | Shimano ................ G03G 9/135 |
| 2022/0035262 A1* | 2/2022 | Nishikawa ........... G03G 9/0827 |
| 2022/0035264 A1* | 2/2022 | Yamashita ............. G03G 9/113 |

FOREIGN PATENT DOCUMENTS

| | | |
|---|---|---|
| JP | 2006-171607 A | 6/2006 |
| JP | 2008-73971 A | 4/2008 |
| JP | 2008-170659 A | 7/2008 |
| JP | 2008-181027 A | 8/2008 |
| JP | 2012-215836 A | 11/2012 |
| JP | 2019-128589 A | 8/2019 |
| JP | 2019-167471 A | 10/2019 |
| JP | 2021-18270 A | 2/2021 |

* cited by examiner

POWDER ADHESIVE AND BONDED ARTICLE

BACKGROUND OF THE INVENTION

Field of the Invention

The present disclosure relates to a powder adhesive that is primarily used to bond paper media, and to a bonded article provided by this powder adhesive.

Description of the Related Art

Conventionally, liquid or paste adhesives have been primarily used to bond paper media. These adhesives are introduced into the unevenness in a medium by being coated on the medium, and an adhesive strength is then developed by solidification brought about by evaporating the water or solvent in the adhesive. Time is thus required up until a satisfactory adhesive strength is elicited.

A method has thus been developed in which a powder adhesive, which is provided by the particulation of an adhesive comprising thermoplastic resin, is coated on a paper medium and adherence is immediately obtained by the application of heat when adherence is to be carried out. For a specific procedure, a powder adhesive has been proposed that is used in a process that applies electrophotographic technology. Adhesion regimens that use electrophotographic technology enable control of the adhesive strength, for example, by using the temperature during bonding and by control of the properties of the resin of the powder adhesive and the amount of application of the powder adhesive.

Japanese Patent Application Laid-open No. 2006-171607 proposes a method in which the effect of a powder adhesive is exhibited by establishing a temperature for softening that is lower than that for electrophotographic toner. Japanese Patent Application Laid-open No. 2008-170659 proposes a powder adhesive for obtaining press-bonded printed material using a cyclic polyolefin resin as a thermoplastic resin, and Japanese Patent Application Laid-open No. 2008-181027 proposes a powder adhesive for obtaining press-bonded printed material using a polyester resin as a thermoplastic resin. Japanese Patent Application Laid-open No. 2019-167471 proposes an adhesive material that uses a styrene resin and a (meth)acrylate ester resin.

SUMMARY OF THE INVENTION

The methods described in these citations can all provide, by changing the bonding conditions depending on the material and application of the adherend, a desired adhesive strength for bonding between the same medium, but it has been found that these are unsatisfactory with regard to the adhesive strength for different paper types.

The powder adhesive of Japanese Patent Application Laid-open No. 2006-171607 does have a satisfactory adhesive strength for the office paper media in general use, i.e., for plain paper. However, it does not develop a satisfactory adhesive strength when repurposed to paper media having a surface that has been smoothened by the addition of large amounts of, for example, a sizing agent, i.e., so-called glossy paper.

With Japanese Patent Application Laid-open Nos. 2008-170659 and 2008-181027, the adherence and peelability are satisfactory for a system in which the same paper medium is folded or stacked. However, when adherence and peeling are carried out in a system in which different paper sheets are stacked, the adherence to one of the paper sheets becomes stronger and, for example, transfer of characters is exhibited post-peeling.

In the case of Japanese Patent Application Laid-open No. 2019-167471, the adhesiveness varies substantially depending on the type of paper, and the adhesiveness is unsatisfactory particularly with paper types that have a large surface unevenness.

The present disclosure provides a powder adhesive, and a bonded article provided by this powder adhesive, with which and for which a high adhesive strength is obtained regardless of the adherend.

A powder adhesive comprising
a thermoplastic resin, and
a particle comprising an aromatic compound,
wherein
the aromatic compound is
a compound comprising an aromatic ring and an azo bond bonded to the aromatic ring, or
a compound comprising a heteroaromatic ring comprising nitrogen atom,
the thermoplastic resin has an ester group; and
designating Es (mmol/g) as the ester group concentration in the thermoplastic resin, M (mass %) as a content of the aromatic compound particles in the powder adhesive, and N (mmol/g) as a nitrogen atom concentration in the aromatic compound particles,
Es is 1.0 to 4.5 mmol/g,
M is $1.0 \times 10^{-4}$ to $1.0 \times 10^{0}$ mass %, and
N is 5.0 to 15.0 mmol/g.

The present disclosure can thus provide a powder adhesive, and a bonded article provided by this powder adhesive, with which and for which a high adhesive strength is obtained regardless of the adherend. Further features of the present invention will become apparent from the following description of exemplary embodiments with reference to the attached drawing.

DESCRIPTION OF THE EMBODIMENTS

Figure 1:
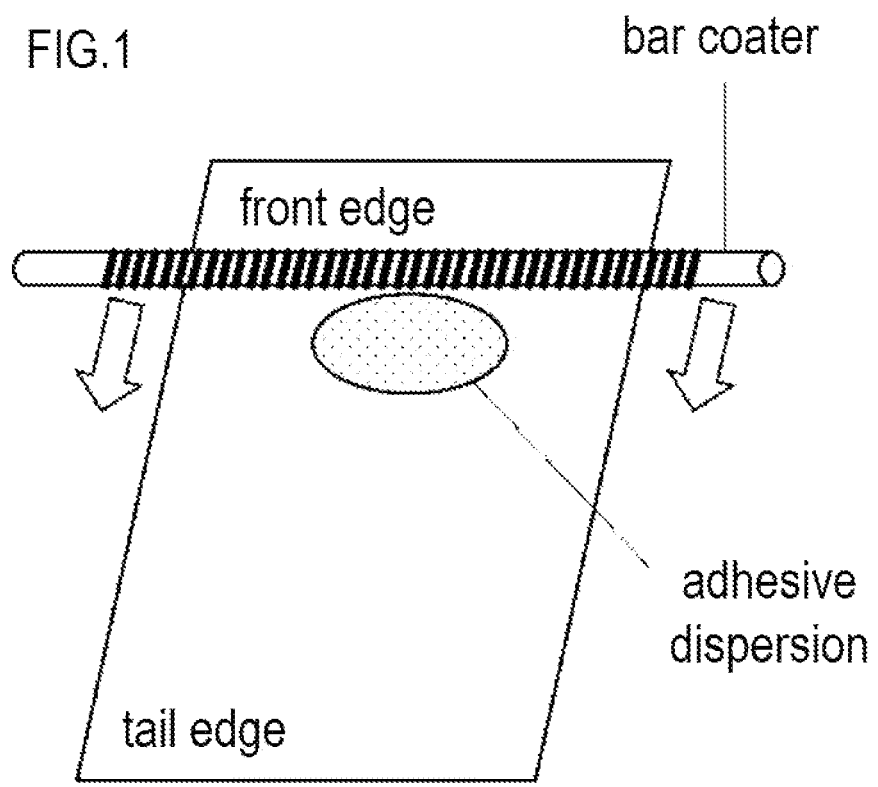
FIG. 1 is a schematic diagram of an evaluation sample.

Unless specifically indicated otherwise, the expressions "from XX to YY" and "XX to YY" that show numerical value ranges refer in the present disclosure to numerical value ranges that include the lower limit and upper limit that are the end points. When numerical value ranges are provided in stages, the upper limits and lower limits of the individual numerical value ranges may be combined in any combination. In addition, the methods for measuring the individual properties are collectively described below.

The adhesive strength of a powder adhesive that uses thermoplastic resin is thought to be substantially influenced by the degree of wetting of the adherend by the thermoplastic resin upon heating and by the affinity between the thermoplastic resin and adherend during heating. The present inventors, focusing on the affinity between the thermoplastic resin and adherend, hypothesized that this affinity is based on hydrogen bonds produced between polar segments present in the thermoplastic resin and the hydroxyl groups present in the cellulose that is the raw material for the paper medium.

In addition, paper such as plain paper typically contains little treatment agent, e.g., sizing agent, and as a consequence exhibits a hydrophilic behavior because the cellulose raw material is substantially distributed at the surface of the paper. Paper such as smooth paper, on the other hand, exhibits a more hydrophobic behavior than plain paper because the depressed portions in the paper are filled with a treatment agent, e.g., a sizing agent or smoothing agent.

A strong adherence to paper that exhibits a hydrophilic behavior has been obtained by using a highly polar resin for the thermoplastic resin used in the powder adhesive, but this has also impeded the generation of a desirable adhesive strength for paper that exhibits hydrophobicity. A strong adherence to paper that exhibits a hydrophobic behavior has been brought about by changing the thermoplastic resin used in the powder adhesive to a low polarity resin, but in this case it has not been possible to maintain the adhesive strength to hydrophilic paper. Thus, achieving a strong adhesive strength regardless of the type of paper has been problematic with conventional powder adhesives.

Thus, in order to obtain a powder adhesive that exhibits a strong adhesive strength regardless of the paper type, it was thought that adherence to both paper exhibiting a hydrophilic behavior and paper exhibiting a hydrophobic behavior could be made possible by exercising a microcontrol of the high-polarity moieties and low-polarity moieties in the adhesive; such a powder adhesive was achieved as a result of extensive and intensive investigations.

The present disclosure relates to a powder adhesive comprising
a thermoplastic resin, and
a particle comprising an aromatic compound,
wherein
the aromatic compound is
a compound comprising an aromatic ring and an azo bond bonded to the aromatic ring, or
a compound comprising a heteroaromatic ring comprising nitrogen atom,
the thermoplastic resin has an ester group; and
designating Es (mmol/g) as the ester group concentration in the thermoplastic resin, M (mass %) as a content of the aromatic compound particles in the powder adhesive, and N (mmol/g) as a nitrogen atom concentration in the aromatic compound particles,
Es is 1.0 to 4.5 mmol/g,
M is $1.0 \times 10^{-4}$ to $1.0 \times 10^{0}$ mass %, and
N is 5.0 to 15.0 mmol/g.

The generation of a satisfactory adhesive strength even with diverse paper types was made possible by designing a powder adhesive with the constitution described above. The present inventors hypothesize as follows with regard to the reasons for this.

The aromatic compound particles are particles of a compound that has an aromatic ring and an azo bond bonded to the aromatic ring, or are particles of a compound that has a heteroaromatic ring comprising nitrogen atom. The azo bond bonded to the aromatic ring and the nonconjugated electron pair of the nitrogen atom present in the heteroaromatic ring comprising nitrogen atom both have a strong affinity for the ester group. Due to this, it is hypothesized that the ester group readily coordinates to the nitrogen atom and the ester group density at the periphery of the aromatic compound particle then increases. Thus, through the incorporation of the aromatic compound particles in the thermoplastic resin, regions are created in the thermoplastic resin in which ester groups are present in a distribution skewed to the periphery of the aromatic compound particles, and a distribution is set up in the thermoplastic resin of regions that have a relatively high ester group density and regions that have a relatively low ester group density.

As a result, the regions having a high ester group density interact more strongly with the hydroxyl groups in cellulose and a strong adhesive strength is developed with paper that exhibits a hydrophilic behavior, such as plain paper. The regions having a low ester group density, on the other hand, exhibit affinity with the hydrophobic regions, e.g., the sizing agent or smoothing agent incorporated in the treated paper medium, and a strong adhesive strength is then also exhibited for hydrophobic paper. It is hypothesized that a strong adherence is thus exhibited regardless of the paper medium because the thermoplastic resin incorporates regions that can exhibit a strong adhesive strength with hydrophilic paper and regions that can exhibit a strong adhesive strength with hydrophobic paper.

In order to obtain this effect, the ester group concentration Es (mmol/g) in the thermoplastic resin must be from 1.0 mmol/g to 4.5 mmol/g. This is the ester group concentration in the resin required for coordination with the aromatic compound particles. The ester group concentration Es (mmol/g) in the thermoplastic resin is preferably from 1.3 mmol/g to 3.5 mmol/g and is more preferably from 1.5 mmol/g to 3.0 mmol/g.

The aforementioned effect is exhibited in the range from $1.0 \times 10^{-4}$ mass % to $1.0 \times 10^{0}$ mass % for the content M (mass %) of the aromatic compound particles in the powder adhesive. These numerical values indicate the aromatic compound particle content in order for the particles of the aromatic compound, which coordinates with the ester groups in the thermoplastic resin, to assume a skewed presence that provides polar regions. This content M (mass %) is preferably from $1.0 \times 10^{-3}$ mass % to $3.0 \times 10^{-1}$ mass % and is more preferably from $3.0 \times 10^{-3}$ mass % to $5.0 \times 10^{-2}$ mass %.

The nitrogen atom concentration N (mmol/g) in the aromatic compound particle must be from 5.0 mmol/g to 15.0 mmol/g. When N is in the indicated range, the nitrogen atom, which is required for ester group coordination, is present in a satisfactory density at the surface of the aromatic compound particle. The nitrogen atom concentration N is preferably from 6.0 mmol/g to 10.5 mmol/g and is more preferably from 8.0 mmol/g to 9.0 mmol/g.

The following formula (1) is preferably satisfied where Es (mmol/g) is the ester group concentration in the thermoplastic resin, M (mass %) is the content of the aromatic compound particles in the powder adhesive, and D (nm) is the number-average particle diameter of the aromatic compound particles in the powder adhesive.

$$1.0 \times 10^{3} Es \times (D/M) \leq 3.0 \times 10^{4} \quad (1)$$

The D/M in formula (1) is an index for the specific surface area of the aromatic compound particles present in the thermoplastic resin. Since Es is the ester group concentration, Es×(D/M) is then an index for the amount of ester group coordinated to the aromatic compound particles in the thermoplastic resin.

A stronger adhesive strength to paper is exhibited when the indicated range of formula (1) is met. It is hypothesized that when the range of formula (1) is satisfied, the difference in polarity between the high-polarity regions and low-polarity regions becomes particularly large due to the strong polarity of the high-polarity regions in the thermoplastic resin in conformity to the density of the ester groups coordinated to the aromatic compound particles. It is thought that as a result the adhesive strength for diverse types of paper is further improved because the high-polarity regions strongly interact with regions that exhibit a hydrophilic behavior and the low-polarity regions strongly interact with regions that exhibit a hydrophobic behavior.

The aforementioned range is considered to be the preferred range for the ester group density in the high-polarity regions to exhibit affinity with the hydroxyl groups present in the cellulose. (1) is preferred, the following formula (2) is more preferred, and the following formula (3) is still more preferred.

$$3.0 \times 10^3 \leq Es \times (D/M) \leq 2.0 \times 10^4 \quad (2)$$

$$5.0 \times 10^3 \leq Es \times (D/M) \leq 1.5 \times 10^4 \quad (3)$$

The number-average particle diameter D (nm) of the aromatic compound particles is preferably from 30 nm to 200 nm. When this range is met, a large effect with regard to action as a polar region is obtained when the ester groups in the thermoplastic resin undergo coordination with the aromatic compound particles. It is thought that this is due to a more appropriate domain size when acting as a polar region. The number-average particle diameter D (nm) is preferably from 40 nm to 150 nm and is more preferably from 50 nm to 120 nm.

The number-average particle diameter D of the aromatic compound particles can be controlled using, for example, a means that disperses the aromatic compound particles. For example, when a media-based dispersing device is used, control can be exercised using the dispersion time, the density of the beads used, the amount of fill by the beads, and the bead diameter.

The aromatic compound particles are preferably particles of a compound that has an aromatic ring and an azo bond bonded to the aromatic ring, and more preferably are particles of a compound containing the structure represented by the following formula (4) (preferably (4-1)) (preferably a pigment and more preferably a yellow pigment). The compound containing the structure represented by formula (4) (preferably (4-1)) is preferably a pigment (preferably a yellow pigment).

The azo bond bonded to the aromatic ring can extend the π-electron conjugation possessed by the aromatic ring to the azo bond segment, and because of this the polarization around the nitrogen atom can be more strongly expressed. In particular, π-electron conjugation can be extended to the acetoacetanilide skeleton segment contained in the structure given by formula (4), which is thus preferred.

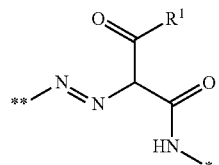

(4)

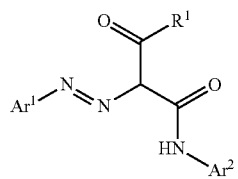

(4-1)

In the formulas (4) and (4-1), $R^1$ represents an alkyl group having 1 to 3 carbon atoms (more preferably 1 carbon atom), and * and ** represent sites of bonding to aromatic rings present in the compound or pigment. $Ar^1$ and $Ar^2$ are independently represent an optionally substituted aromatic ring (an optionally substituted phenyl group is more preferred).

On the other hand, a broad conjugated π-electron plane is established when the aromatic compound is a compound having an aromatic ring and an azo bond bonded to the aromatic ring, and due to this the absorption of visible light may occur and the aromatic compound particles may develop color. The powder adhesive may then readily develop color depending on the amount of addition of the aromatic compound particles. As a consequence, when the powder adhesive is used to adhere paper and the paper is a thin type, the problem can occur of the appearance of color post-bonding.

With the structure given in the formula (4), the conjugated π-electron plane containing the nitrogen atoms is broad and its participation in a larger π-conjugation plane is impeded due to the occurrence of strong polarization. As a result, light absorption of ultraviolet to blue wavelengths is readily produced and color development is limited to yellow to light yellow and the coloration can be minimized. The structure in the formula (4) is excellent in terms of minimizing color and generating a strong adhesive strength by the powder adhesive regardless of paper type.

The thermoplastic resin preferably comprises a copolymer of monomers comprising a styrenic polymerizable monomer, and at least one selected from the group consisting of acrylate esters and methacrylate esters. The thermoplastic resin more preferably is a copolymer of styrenic polymerizable monomer and at least one selected from the group consisting of acrylate esters and methacrylate esters.

The styrenic polymerizable monomer preferably contains styrene. The proportion of styrene-derived structure in the aforementioned copolymer is preferably 50 mass % to 90 mass %, more preferably 60 mass % to 85 mass %, and still more preferably 70 mass % to 80 mass %.

The proportion in the copolymer of structures derived from at least one selection from the group consisting of acrylate esters and methacrylate esters is preferably 10 mass % to 50 mass %, more preferably 15 mass % to 40 mass %, and still more preferably 20 mass % to 30 mass %.

With this copolymer, the ester groups in the resin are contained in side chain position rather than in the main chain, and this is thought to result in facile coordination to the aromatic compound particles and the ready occurrence of polarization within the resin when the ester group is coordinated, and to also be suitable for the appearance of low-polarity regions. In addition, powder adhesive that uses such a copolymer also has an excellent storability in high-temperature, high-humidity environments. This is thought to be due to the fact that the ester group is not present in the main chain, which makes it difficult for moisture adsorption to the resin to occur.

The content of this copolymer in the thermoplastic resin is preferably from 70 mass % to 100 mass %, more preferably from 80 mass % to 98 mass %, and still more preferably from 85 mass % to 95 mass %.

An even better storability at high temperatures/high humidities is obtained by the presence of this copolymer in the thermoplastic resin at the aforementioned proportions. Even if moisture adsorption does end up occurring even with the use of the resin having the ester group in side chain position, it is hypothesized that the exposure of polar moieties at the surface of the powder adhesive is impeded by the coordination to the aromatic compound particles of the side-chain ester groups of the thermoplastic resin, which results in the expression of a better storability.

The polymerizable monomer that can form the copolymer can be exemplified by styrenic polymerizable monomers such as styrene, α-methylstyrene, and divinylbenzene, and by acrylate esters and methacrylate esters such as methyl acrylate, butyl acrylate, methyl methacrylate, 2-hydroxyethyl methacrylate, t-butyl methacrylate, and 2-ethylhexyl methacrylate. The use of a single one of these or a combination of a plurality of these is preferred.

The copolymer of monomer that contains styrenic polymerizable monomer and at least one selection from the group consisting of acrylate esters and methacrylate esters, is more preferably a copolymer of styrene, divinylbenzene, and at least one selection from the group consisting of acrylate esters and methacrylate esters.

A crosslinking agent may be added when this copolymer is produced. That is, the copolymer preferably has a crosslinked structure provided by a crosslinking agent. The amount of the crosslinking agent-derived structure (crosslinked structure) in the thermoplastic resin is preferably 0.01 mass % to 1.0 mass % and is more preferably 0.1 mass % to 0.5 mass %.

For example, examples of the crosslinking agent include divinyl benzene, bis(4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, acrylates of polyethylene glycol #200, #400 and #600, dipropylene glycol diacrylate, polypropylene glycol diacrylate, polyester diacrylate (MANDA, Nippon Kayaku), and the above acrylates converted to methacrylates.

Examples of polyfunctional crosslinkable monomers include pentaerythritol triacrylate, trimethylolethane triacrylate, trimethylolpropane triacrylate, tetramethylolmethane tetraacrylate, oligoester acrylate and methacrylate, 2,2-bis(4-methacryloxy-polyethoxyphenyl) propane, diacryl phthalate, triallyl cyanurate, triallyl isocyanurate, triallyl trimellitate and diaryl chlorendate.

The thermoplastic resin may contain a thermoplastic resin other than the aforementioned copolymer. There are no particular limitations on this thermoplastic resin, and it can be exemplified by known thermoplastic resins, e.g., polyester resins, vinyl resins, acrylic resins, styrene-acrylic resins, polyethylenes, polypropylenes, polyolefins, ethylene-vinyl acetate copolymer resins, and ethylene-acrylic acid copolymer resins.

Polyester resins and styrene-acrylic resins are preferred among these resins, with polyester resins being more preferred. A known polyester resin may be used for the polyester resin.

A specific example here is the condensation polymer of a dihydric alcohol with a dibasic acid or derivative thereof (carboxylic acid halide, ester, or anhydride). The following may be used on an optional basis: an at least tribasic polybasic acid or a derivative thereof (carboxylic acid halide, ester, or anhydride), a monobasic acid, an at least trihydric alcohol, and a monohydric alcohol.

The dibasic acid can be exemplified by aliphatic dibasic acids such as maleic acid, fumaric acid, itaconic acid, oxalic acid, malonic acid, succinic acid, dodecylsuccinic acid, dodecenylsuccinic acid, adipic acid, azelaic acid, sebacic acid, and decane-1,10-dicarboxylic acid, and by aromatic dibasic acids such as phthalic acid, tetrahydrophthalic acid, hexahydrophthalic acid, tetrabromophthalic acid, tetrachlorophthalic acid, HET acid, himic acid, isophthalic acid, terephthalic acid, and 2,6-naphthalenedicarboxylic acid.

The dibasic acid derivatives can be exemplified by the carboxylic acid halides, esters, and anhydrides of the aforementioned aliphatic dibasic acids and aromatic dibasic acids.

The dibasic alcohol, on the other hand, can be exemplified by noncyclic aliphatic diols, e.g., ethylene glycol, 1,2-propanediol, 1,3-propanediol, 1,4-butanediol, 1,5-pentanediol, 1,6-hexanediol, diethylene glycol, dipropylene glycol, triethylene glycol, and neopentyl glycol; bisphenols such as bisphenol A and bisphenol F; alkylene oxide adducts on bisphenol A, e.g., ethylene oxide adducts on bisphenol A and propylene oxide adducts on bisphenol A; and aralkylene glycols such as xylylene diglycol.

The at least tribasic polybasic acids and their anhydrides can be exemplified by trimellitic acid, trimellitic anhydride, pyromellitic acid, and pyromellitic anhydride.

The polymerizable monomer that can form the styrene-acrylic resin can be exemplified by styrene and styrenic monomers such as α-methylstyrene and divinylbenzene; unsaturated carboxylic acid esters such as methyl acrylate, butyl acrylate, methyl methacrylate, 2-hydroxyethyl methacrylate, t-butyl methacrylate, and 2-ethylhexyl methacrylate; unsaturated carboxylic acids such as acrylic acid and methacrylic acid; unsaturated dicarboxylic acids such as maleic acid; unsaturated dicarboxylic acid anhydrides such as maleic anhydride; nitrile-type vinyl monomers such as acrylonitrile; halogenated vinyl monomers such as vinyl chloride; and nitro-type vinyl monomers such as nitrostyrene. A single one of these may be used by itself or a plurality may be used in combination.

The content of the polyester resin in the thermoplastic resin is preferably 0 mass % to 30 mass % and is more preferably 3 mass % to 15 mass %.

The number-average molecular weight Mn of the thermoplastic resin is preferably 5,000 to 50,000 and more preferably 10,000 to 40,000. The weight-average molecular weight Mw of the thermoplastic resin is preferably 20,000 to 200,000 and more preferably 50,000 to 150,000. The peak molecular weight Mp of the thermoplastic resin is preferably 10,000 to 100,000 and more preferably 15,000 to 50,000.

The glass transition temperature Tg of the thermoplastic resin is preferably 40° C. to 90° C. and more preferably 50° C. to 65° C.

The powder adhesive may contain a wax component from the standpoints of controlling the affinity with adherends and controlling the viscosity upon the application of heat. The wax added as this wax component is preferably a hydrocarbon wax and/or an ester wax. The powder adhesive preferably contains a hydrocarbon wax and an ester wax. The hydrocarbon wax is preferred for controlling the affinity between the thermoplastic resin and the adherend, and the ester wax is preferred for controlling the viscosity of the thermoplastic resin.

The hydrocarbon wax preferably is a chain-type saturated hydrocarbon having a peak value for the number of carbon atoms of from 20 to 70 (preferably from 30 to 60). The aforementioned hydrocarbon wax is preferred because it readily crystallizes and does not impair the thermal characteristics of the thermoplastic resin. The peak value for the number of carbon atoms is the value provided by dividing the peak value for the molecular weight yielded by measurement of the molecular weight of the hydrocarbon wax, by 14—the formula weight of $CH_2$. The content of the hydrocarbon wax, per 100 mass parts of the thermoplastic resin, is preferably in the range from 0.0 mass parts to 15.0 mass parts. From 1.0 mass parts to 10.0 mass parts is more preferred.

The ester wax preferably contains at least one selection from the group consisting of ester waxes with the following formula (5) and ester waxes with the following formula (6).

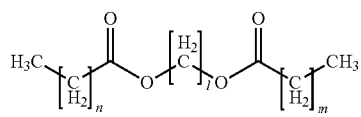

(5)

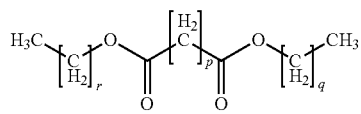

(6)

In the formulas, 1 represents a positive integer from 2 to 12 (preferably from 2 to 4), and n and m each independently represent a positive integer from 12 to 20 (preferably from 14 to 20). p represents a positive integer from 2 to 10 (preferably from 2 to 4), and q and r each independently represent a positive integer from 11 to 21 (preferably 14 to 20).

The ester waxes given by the formula (5) and the formula (6), because they have a straight-chain structure, readily crystallize and exhibit a high crystallinity in the powder adhesive, and are thus preferred from the standpoints of the viscosity reduction upon heating and the adhesive strength when not being heated. The ester wax is more preferably a compound given by the following formula (7).

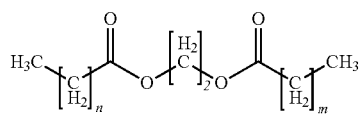

(7)

n and m each independently represent a positive integer from 14 to 20.

The structure with the formula (7) is more suitable for the expression of a viscosity-reducing effect for the thermoplastic resin. The ester wax content, per 100 mass parts of the thermoplastic resin, is preferably from 0.3 mass parts to 30.0 mass parts, more preferably from 3.0 mass parts to 25.0 mass parts, and still more preferably from 5.0 mass parts to 20.0 mass parts. When the ester wax is incorporated in this range in the thermoplastic resin, penetration into the unevenness of paper media is further facilitated and the adhesive strength can be improved.

The aromatic compound particles will now be described. The aromatic compound particles are particles of a compound that has an aromatic ring and an azo bond bonded to the aromatic ring, or are particles of a compound that has a heteroaromatic ring comprising nitrogen atom. The presence of a structure as used in, for example, organic pigments, is preferred from the standpoint of the presence of the nitrogen atom as indicated above and from the standpoint of the ability to exist as solid particles in the thermoplastic resin. The aromatic compound particles preferably are an organic pigment.

The organic pigment can be specifically exemplified by monoazo compounds; disazo compounds; condensed azo compounds; isoindolinone compounds; isoindoline compounds; benzimidazolone compounds; anthraquinone compounds; azo metal complexes; methine compounds; allylamide compounds; diketopyrrolopyrrole compounds; anthraquinone compounds; quinacridone compounds; naphthol compounds; thioindigo compounds; perylene compounds; and copper phthalocyanine compounds and derivatives thereof.

Examples at a more specific level are C. I. Pigment Yellow 74, 93, 95, 111, 155, 174, 180, and 185; C. I. Pigment Red 122, 150, 185, 202, 206, 220, 221, 254, 255, 269, and 272; C. I. Pigment Violet 19; and C. I. Pigment Blue 15, 15:1, 15:2, 15:3, and 15:4.

The aromatic compound particles are preferably particles of at least one selected from the group consisting of C. I. Pigment Yellow 74, C. I. Pigment Yellow 95, C. I. Pigment Yellow 155, and C. I. Pigment Yellow 180. Particles of at least one selected from the group consisting of C. I. Pigment Yellow 74, C. I. Pigment Yellow 155, and C. I. Pigment Yellow 180 are even more preferred.

The weight-average particle diameter (D4) of the powder adhesive is preferably from 0.1 μm to 100.0 μm. When this particle diameter range is met, adhesive strength is readily obtained because burying in the unevenness of the paper medium does not occur, and a smooth finish post-adhesion is also readily provided. The weight-average particle diameter (D4) of the powder adhesive is more preferably from 1.0 μm to 30.0 μm and still more preferably from 3.0 μm to 15.0 μm.

The content of the thermoplastic resin in the powder adhesive is preferably 60.00 mass % to 99.99 mass %, more preferably 70.00 mass % to 95.00 mass %, and still more preferably 80.00 mass % to 92.00 mass %.

The proportion on a mass basis of the aromatic compound particles to the thermoplastic resin (aromatic compound particles/thermoplastic resin) is preferably 0.000010 to 0.010, more preferably 0.000020 to 0.0040, and still more preferably 0.000040 to 0.00020.

In addition, an external additive and so forth may be mixed on an optional basis with the powder adhesive in order to adhere same to the surface of the powder adhesive. This external additive can be exemplified by inorganic fine particles selected from silica fine particles, alumina fine particles, and titania fine particles and by composite oxides of the preceding. The composite oxides can be exemplified by silica-aluminum fine particles and strontium titanate fine particles. The external additive content in the powder adhesive is preferably from 0.01 mass % to 10.0 mass % and is more preferably from 0.1 mass % to 4.0 mass %.

The method for producing the powder adhesive should be a production method that provides a powder in the particle diameter range indicated above, but is not otherwise particularly limited. The application of known toner production methods is preferred. Known production methods such as the pulverization method, suspension polymerization method, emulsion aggregation method, and dissolution suspension method are examples of toner production methods that may be used to obtain the powder adhesive, but the production method is not particularly limited.

Among the preceding, the suspension polymerization method is preferred from the standpoint of having the storability coexist with a strong adhesiveness by the powder adhesive. When, in order to improve the adhesiveness of the powder adhesive, a lowering of the viscosity of the thermoplastic resin was pursued through a reduction in the Tg and a reduction in the molecular weight, the present inventors discovered that the storability in high-temperature, high-humidity environments is substantially improved by using the suspension polymerization method. The powder adhesive is preferably a powder adhesive produced by the suspension polymerization method.

In the case of the thermoplastic resin in a powder adhesive produced by the suspension polymerization method, resin elongation occurs at the same time as particle formation. The inventors believe that molecular entanglement at this time is influential. In particular, a substantial storability-improving effect appears when a crosslinking agent is used.

In the suspension polymerization method, a polymerizable monomer composition is first obtained by dispersing the aromatic compound particles and optionally any additional thermoplastic resin, wax, crosslinking agent, charge control agent, and other additives to uniformity in polymerizable monomer that can form the thermoplastic resin. This is followed by dispersion of the resulting polymerizable monomer composition in a continuous phase (for example, an aqueous phase) that contains a dispersion stabilizer to form particles of the polymerizable monomer composition (granulation), and the execution of a polymerization reaction by the polymerizable monomer to yield the powder adhesive.

The Bonded Article

The powder adhesive described in the preceding can be used as the adhesive in a bonded article comprising an adhesive, and at least one piece of paper bonded with the adhesive. This adhesive is the melted and hardened material from a powder adhesive.

There are no particular limitations on the means of obtaining the bonded article. The powder adhesive may be applied to a desired region on a sheet of folded paper or between a plurality of sheets of paper that are stacked, and heat and optionally pressure may be applied. Alternatively, paper having a bonding region may be obtained by loading the powder adhesive at a desired location on paper and fixing the powder adhesive onto the paper by the application of heat and optionally pressure. A bonded article may also be obtained by folding a bonding region-bearing paper, or stacking a bonding region-bearing paper with another paper, and applying heat and optionally pressure.

There are no particular limitations on the means for applying heat and optionally pressure. For example, a hot plate or a laminator may be used. The fixing process used in electrophotographic systems may be employed. When a bonding region is to be formed on paper, the developing process and fixing process used in electrophotographic systems may also be adopted. There are no particular limitations on the temperature during the application of heat. Any temperature at which the powder adhesive melts may be used.

The adhesive strength per 1 cm of width when the bonded article is peeled is preferably 1.20 N/cm$^2$ to 2.50 N/cm$^2$ and is more preferably 1.60 N/cm$^2$ to 2.00 N/cm$^2$.

The adhesive strength can be measured using a Tensilon RTG-1225 (A & D Company, Limited) universal tester and using the methods described below in (Preparation of Evaluation Samples) and (Evaluation of Adhesive Strength).

The methods for measuring the individual properties are described in the following.

Methods for Identifying the Molecular Structure of the Thermoplastic Resins and Waxes and Measuring the Content of the Thermoplastic Resin Present in the Powder Adhesives and the Content of the Wax Present in the Powder Adhesives Pyrolysis gas chromatography/mass spectrometry (abbreviated pyrolysis GC/MS) and NMR are used to identify the molecular structure of the thermoplastic resins and waxes and to measure the content of the thermoplastic resin present in the powder adhesive and the content of the wax present in the powder adhesive. In pyrolysis GC/MS, the monomer constituting the total resin in the sample can be determined and the peak area for each monomer can be acquired; however, standardization of the peak intensity using a sample of known concentration for reference is required in order to carry out quantitation. With NMR, on the other hand, determination and quantitation of the constituent monomer can be performed without having to use a sample of known concentration.

Thus, in order to determine the constituent monomer and depending on the circumstances, both the NMR and pyrolysis GC/MS spectra are obtained and are compared.

Specifically, quantitation is carried out by NMR measurement when the resin component insoluble in deuterated chloroform, which is the extraction solvent for the NMR measurement, is less than 5.0 mass %. On the other hand, when the resin component insoluble in deuterated chloroform, which is the extraction solvent for the NMR measurement, is present at 5.0 mass % or more, both NMR and pyrolysis GC/MS measurements are carried out on the deuterated chloroform-soluble matter and pyrolysis GC/MS measurement is carried out on the deuterated chloroform-insoluble matter.

In this case, the NMR measurement of the deuterated chloroform-soluble matter is first carried out and determination and quantitation of the constituent monomers is performed (quantitation result 1). The pyrolysis GC/MS measurement is then carried out on the deuterated chloroform-soluble matter and the peak areas of the peaks assigned to the individual constituent monomers are determined. The relationship between the amount of each constituent monomer and the pyrolysis GC/MS peak area is determined using the quantitation result 1 obtained in the NMR measurement.

Pyrolysis GC/MS measurement is then carried out on the deuterated chloroform-insoluble matter and the peak areas of the peaks assigned to the individual constituent monomers are determined. Quantitation (quantitation result 2) of the constituent monomer in the deuterated chloroform-insoluble matter is performed from the relationship, obtained in the measurement of the deuterated chloroform-soluble matter, between the amount of each constituent monomer and the pyrolysis GC/MS peak area.

Quantitation result 1 and quantitation result 2 are combined to provide the final quantitation result for each constituent monomer. The specific procedure is carried out as follows.

(1) 50 mg of the powder adhesive is exactly weighed into an 8 mL glass sample bottle; 1 mL of deuterated chloroform is added and the lid is applied; and dispersion and dissolution are carried out for 1 hour using an ultrasound disperser. Filtration is then performed across a 0.4 μm-diameter membrane filter and the filtrate is recovered. In this case, the deuterated chloroform-insoluble matter remains on the membrane filter.

(2) $^1$H-NMR measurement is run on the filtrate, and the spectrum is assigned and the quantitative value is determined for each constituent monomer in the resin.

(3) Analysis by pyrolysis GC/MS is carried out when analysis of the deuterated chloroform-insoluble matter is required. A derivatization treatment, e.g., methylation, is carried out as necessary.

NMR Measurement Conditions

Bruker AVANCE 500 from Bruker BioSpin

Measurement nucleus: $^1$H

Measurement frequency: 500.1 MHz
Number of scans: 16
Measurement temperature: room temperature
Pyrolysis GC/MS Measurement Conditions
Pyrolysis instrument: TPS-700 from Japan Analytical Industry Co., Ltd.
Pyrolysis temperature: suitable values from 400° C. to 600° C. GC/MS instrument: ISQ from Thermo Fisher Scientific K.K.
Column: "HP5-MS" (Agilent/190915-433), length=30 m, inner diameter=0.25 mm, Film thickness=0.25 μm
GC/MS conditions
Inlet port conditions:
InletTemp: 250° C.
SplitFlow: 50 mL/min
GC ramp up conditions: 40° C. (5 min)→10° C./min (300° C.)→300° C. (20 min)

In addition, when results are obtained that suggest that the thermoplastic resin contains a plurality of components, the powder adhesive is dissolved in THF and the solvent is distilled off under reduced pressure from the obtained soluble matter to yield the THF-soluble matter of the powder adhesive. The obtained THF-soluble matter from the powder adhesive is dissolved in chloroform to prepare a sample solution with a concentration of 25 mg/mL.

3.5 mL of the obtained sample solution is injected into the instrument described below and is fractionated as follows using the conditions described below: component with a number-average molecular weight (Mn) less than 2,000, greater than or equal to 2,000 and less than 5,000, greater than or equal to 5,000 and less than 10,000, greater than or equal to 10,000 and less than 30,000, and greater than or equal to 30,000.

Preparative GPC instrument: Model LC-980 preparative HPLC, Japan Analytical Industry Co., Ltd.

Preparative column: JAIGEL 3H, JAIGEL 5H (Japan Analytical Industry Co., Ltd.)
Eluent: chloroform
Flow rate: 3.5 mL/min A molecular weight calibration curve constructed using polystyrene resin standards (for example, product name "TSK Standard Polystyrene F-850, F-450, F-288, F-128, F-80, F-40, F-20, F-10, F-4, F-2, F-1, A-5000, A-2500, A-1000, A-500", Tosoh Corporation) is used to determine the molecular weight of the sample.

After fractionation of the individual components, the solvent is removed by distillation under reduced pressure and the solid is fractionated by recrystallization from acetone and is dried for 24 hours under reduced pressure in a 90° C. atmosphere. This procedure is repeated until about 100 mg of each component is respectively obtained. Each of the obtained components is analyzed using the identification procedure described above and the structure of each thermoplastic resin is identified and the content is determined.

Method for Calculating the Ester Group Concentration in the Thermoplastic Resin

The ester group concentration Es in the thermoplastic resin is calculated from the mass ratio and the molecular structure of the constituent monomer of the thermoplastic resin as obtained in the measurements described in the preceding. Using nc (g/mol) for the molecular weight of the monomer that is the source of the structure constituting the thermoplastic resin and ac (mol) for the number of ester groups present in 1 molecule of this monomer, the ester group concentration Es in the thermoplastic resin is then $$Es=1,000 \times ac/nc \text{ (mmol/g)}.$$

When the thermoplastic resin is composed of a plurality of monomers, the ester group concentration is similarly determined for each monomer. The calculation is carried out as an average value from the resulting ester group concentrations for the individual monomers and the content (mass %) in the thermoplastic resin of the structure derived from each monomer, with the content as shown below being multiplied as a coefficient. For example, for a thermoplastic resin composed of three monomers designated monomer 1, monomer 2, and monomer 3, and designating the ester group concentration of monomer 1 as Es1 and its component ratio (mass % in the thermoplastic resin) as Nc1, the ester group concentration of monomer 2 as Es2 and its component ratio as Nc2, and the ester group concentration of monomer 3 as Es3 and its component ratio as Nc3, Es is then calculated using the following formula.

$$Es=Es1 \times (Nc1/(Nc1+Nc2+Nc3))+Es2 \times (Nc2/(Nc1+Nc2+Nc3))+Es3 \times (Nc3/(Nc1+Nc2+Nc3))$$

In this case there is no limit on the number of monomers that may be used at the same time. In addition, when the thermoplastic resin contains a plurality of resins, the calculation is carried out as an average value with the content (mass %) being multiplied as a coefficient.

Method for Measuring the Glass Transition Temperature (Tg)

The glass transition temperature (Tg) of the thermoplastic resin and so forth is measured using a "Q1000" differential scanning calorimeter (TA Instruments). The melting points of indium and zinc are used for temperature correction in the instrument detection section, and the heat of fusion of indium is used for correction of the amount of heat.

Specifically, 1 mg of the sample is exactly weighed out and introduced into an aluminum pan; an empty aluminum pan is used for reference. Using modulation measurement mode, measurement is carried out in the range from 0° C. to 100° C. at a ramp rate of 1° C./minute and a temperature modulation condition of ±0.6° C./60 s. Because a change in the specific heat is obtained during the temperature ramp up process, the glass transition temperature (Tg) is taken to be the point at the intersection between the differential heat curve and the line for the midpoint for the baselines for prior to and subsequent to the appearance of the change in the specific heat.

Method for Measuring the Weight-Average Particle Diameter (D4) of the Powder Adhesive The weight-average particle diameter (D4) is determined proceeding as follows. The measurement instrument used is a "Coulter Counter Multisizer 3" (registered trademark, Beckman Coulter, Inc.), a precision particle size distribution measurement instrument operating on the pore electrical resistance method and equipped with a 100 μm aperture tube. The measurement conditions are set and the measurement data are analyzed using the accompanying dedicated software, i.e., "Beckman Coulter Multisizer 3 Version 3.51" (Beckman Coulter, Inc.). The measurements are carried out in 25,000 channels for the number of effective measurement channels.

The aqueous electrolyte solution used for the measurements is prepared by dissolving special-grade sodium chloride in deionized water to provide a concentration of 1.0% and, for example, "ISOTON II" (Beckman Coulter, Inc.) can be used. The dedicated software is configured as follows prior to the execution of measurement and analysis.

In the "modify the standard operating method (SOMME)" screen in the dedicated software, the total count number in the control mode is set to 50,000 particles; the number of measurements is set to 1 time; and the Kd value is set to the value obtained using "standard particle 10.0 μm" (Beckman Coulter, Inc.). The threshold value and noise level are automatically set by pressing the "threshold value/noise level measurement button". In addition, the current is set to 1,600 μA; the gain is set to 2; the electrolyte solution is set to ISOTON II; and a check is entered for the "post-measurement aperture tube flush". In the "setting conversion from pulses to particle diameter" screen of the dedicated software, the bin interval is set to logarithmic particle diameter; the particle diameter bin is set to 256 particle diameter bins; and the particle diameter range is set to 2 μm to 60 μm.

The specific measurement procedure is as follows.

(1) 200.0 mL of the aqueous electrolyte solution is introduced into a 250 mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) 30.0 mL of the aqueous electrolyte solution is introduced into a 100 mL flatbottom glass beaker. To this is added as dispersing agent 0.3 mL of a dilution prepared by the three-fold (mass) dilution with deionized water of "Contaminon N" (a 10% aqueous solution of a neutral pH 7 detergent for cleaning precision measurement instrumentation, comprising a nonionic surfactant, anionic surfactant, and organic builder, from Wako Pure Chemical Industries, Ltd.).

(3) An "Ultrasonic Dispersion System Tetra 150" (Nikkaki Bios Co., Ltd.) is prepared; this is an ultrasound disperser with an electrical output of 120 W and is equipped with two oscillators (oscillation frequency=50 kHz) disposed such that the phases are displaced by 180°. 3.3 L of deionized water is introduced into the water tank of the ultrasound disperser and 2.0 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, 10 mg of the measurement sample is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the aqueous electrolyte solution prepared in (5) and containing dispersed toner particles, is dripped into the roundbottom beaker set in the sample stand as described in (1) with adjustment to provide a measurement concentration of 5%. Measurement is then performed until the number of measured particles reaches 50,000.

(7) The measurement data is analyzed by the dedicated software provided with the instrument and the weight-average particle diameter (D4) is calculated. When set to graph/volume % with the dedicated software, the "average diameter" on the "analysis/volumetric statistical value (arithmetic average)" screen is the weight-average particle diameter (D4).

Method for Measuring the Molecular Weight Distribution and the Peak Molecular Weight The molecular weight distribution and peak molecular weight are measured using gel permeation chromatography (GPC) as follows. First, the measurement sample is dissolved in tetrahydrofuran (THF). The obtained solution is filtered using a "Sample Pretreatment Cartridge" (Tosoh Corporation) solvent-resistant membrane filter having a pore diameter of 0.2 μm to obtain a sample solution. The sample solution is adjusted to a concentration of THF-soluble component of 0.8 mass %. Measurement is carried out under the following conditions using this sample solution.

Instrument: "HLC-8220GPC" high-performance GPC instrument [Tosoh Corporation]
Column: 2×LF-604 [Showa Denko Kabushiki Kaisha]
Eluent: THF
Flow rate: 0.6 mL/min
Oven temperature: 40° C.
Sample injection amount: 0.020 mL A molecular weight calibration curve constructed using polystyrene resin standards (for example, product name "TSK Standard Polystyrene F-850, F-450, F-288, F-128, F-80, F-40, F-20, F-10, F-4, F-2, F-1, A-5000, A-2500, A-1000, A-500", Tosoh Corporation) is used to determine the molecular weight of the sample. The largest peak in the obtained molecular weight distribution is taken to be the main peak, and the molecular weight value for this peak is designated the peak molecular weight.

Method for Measuring the Content M of the Aromatic Compound Particles

The content M of the aromatic compound particles is determined using ultraviolet-visible absorption spectroscopy. A square 1 mm thick spacer is placed on a glass slide; 50 mg of the powder adhesive is placed on this; and melting is brought about by heating at 120° C. to 180° C. on a hot plate. A glass slide is then mounted on the spacer to sandwich it and cooling is carried out. The absence of air bubbles and so forth is confirmed and measurement with a UV-visible spectrophotometer is performed.

When a crystalline material, e.g., wax, is present and the determination is impeded by the crystalline fraction, the measurement is carried out with the preparation of separate samples for the THF-soluble matter and -insoluble matter of the powder adhesive. For the THF-insoluble matter in the powder adhesive, a sample of the THF-insoluble matter is prepared using the following procedure. First, the powder adhesive is dissolved in THF; the resulting solution is separated into a sedimented phase and a THF phase by centrifugal separation; and the THF phase is removed from this by decantation. This is followed by another addition of THF to the sedimented phase and thorough dispersion, and then another centrifugal separation of this solution into a sedimented phase and a THF phase and removal of the THF phase by decantation. The resulting sedimented phase is dried to provide the sample of the THF-insoluble matter.

For the THF soluble matter of the powder adhesive, 50 mg of the sample dissolved in 30 mL THF is introduced into a 10 mm×10 mm×50 mm quartz cell and measurement is carried out using this. When a satisfactory absorbance is not obtained, the amount of THF is adjusted as appropriate. For quantitation, the structure of the aromatic compound particles present in the powder adhesive is preliminarily determined and calibration is performed by separately preparing the same compound and constructing a calibration curve. The method for preparing the samples for calibration curve construction is described in the following.

The following sample is weighed into a glass bottle and dispersion is carried out for 18 hours using a paint shaker.
   Aromatic compound particles: 5.00 mass parts
   Zirconia beads with a diameter of 2 mm: 70 mass parts
   Toluene: 45.00 mass parts The resulting dispersion is diluted with toluene to prepare a 100,000×-diluted sample, a 10,000×-diluted sample, a 1,000×-diluted sample, and a 100×-diluted sample and a calibration curve is acquired. The content M of the aromatic compound particles in the powder adhesive is measured by taking the absorption spectrum of the obtained sample using an ultraviolet-visible spectrophotometer (UV-2600, Shimadzu Corporation) and carrying out quantitation at an absorption wavelength that is characteristic of the aromatic compound particles.

Method for Determining the Number-Average Particle Diameter D of the Aromatic Compound Particles The number-average particle diameter D of the aromatic compound particles is determined by observation of the cross section of the powder adhesive using a scanning transmission electron microscope (STEM). The procedure for preparing the cross section of the powder adhesive is described in the following.

The powder adhesive is first broadcast into a single layer on a cover glass (square cover glass, Square No. 1, Matsunami Glass Ind., Ltd.), and an Os film (5 nm) and a naphthalene film (20 nm) are executed thereon as protective films using an Osmium Plasma Coater (OPC80T, filgen, Inc.).

D800 photocurable resin (JEOL Ltd.) is then filled into a PTFE tube (1.5 mm inner diameter×3 mm outer diameter×3 mm), and the aforementioned cover glass is gently placed on the tube with the powder adhesive facing so as to come into contact with the D800 photocurable resin. This assembly is exposed to light and the resin is cured, followed by removal of the cover glass and tube to produce a resin cylinder in which the powder adhesive is embedded in the surfacemost side.

Using an ultrasound ultramicrotome (UC7, Leica), cross sections of the center of the powder adhesive are generated by slicing, from the surfacemost side of the resin cylinder at a slicing rate of 0.6 mm/s, at just the length of the radius of the adhesive powder (for example, 4.0 µm when the weight-average particle diameter (D4) is 8.0 µm). Slicing is then carried out so as to provide a film thickness of 100 nm to produce thin-section samples of the cross section of the powder adhesive. Cross sections of the center of the powder adhesive can be obtained by slicing using this procedure.

The image was acquired using a STEM probe size of 1 nm and an image size of 1024×1024 pixels. The image is acquired by adjusting the Contrast to 1425 and the Brightness to 3750 on the Detector Control panel for the brightfield image and adjusting the Contrast to 0.0, the Brightness to 0.5, and the Gamma to 1.00 on the Image Control panel. Image acquisition is carried out at an image magnification of 300,000×.

The long diameter and short diameter are measured on 300 of the aromatic compound particles in the obtained image, and a histogram with a 5 nm interval is constructed based on the value of (long diameter+short diameter)/2. The 50% numerical diameter is calculated based on the resulting histogram and this is designated the number-average particle diameter D of the aromatic compound particles.

The aromatic compound particles in the image can be easily delineated because they present a clear contrast difference. In those instances where the aromatic compound particles are not readily discriminated, the aromatic compound particles can be discriminated by checking for the presence of nitrogen by element mapping using energy-dispersive x-ray analysis (EDX).

Method for Identifying the Aromatic Compound Particles and Calculation of the Nitrogen Atom Concentration N The THF-insoluble matter of the powder adhesive, obtained by the procedure described above, is used to identify the aromatic compound. The insoluble matter of the powder adhesive can be analyzed using ion-trap GC-MS, which is a mass spectrometric technique. The analytic conditions for ion-trap GC-MS are given below.

Instrument: Polaris Q (ion-trap GC-MS from Thermo Fisher Scientific Inc.)
   Sample: THF-insoluble matter of the powder adhesive
   Probe: direct sample insertion probe (DEP)
   Ion Source Temp.: 200° C.
   Electron Energy: 70 eV
   Emission Current: 250 µA
   Mass Range: m/z 30-1000 (EI) & 50-1000 (CI)
   Reagent Gas: methane (CI)

The nitrogen atom concentration N is calculated by dividing the number of nitrogen atoms in the identified aromatic compound by the molecular weight of the aromatic compound.

EXAMPLES

The present invention is specifically described in the following using examples, but the present invention is not limited to or by these examples. The parts in the examples is on a mass basis unless specifically indicated otherwise.

Thermoplastic Resin a1 Production Example

Toluene 300 parts

Styrene 74.7 parts n-butyl acrylate 25.0 parts

Divinylbenzene 0.3 parts (m- and p-mixture) (contains ethylvinylbenzene and diethylbenzene)

These raw materials were introduced into a reactor equipped with a stirrer, thermometer, and reflux condenser, and heating to 70° C. was carried out on a hot bath while purging with nitrogen. While thoroughly stirring the reactor, 3.5 parts of the polymerization initiator t-butyl peroxypivalate was introduced over 3 minutes.

While maintaining these conditions and 70° C., polymerization was continued for 4.5 hours, after which cooling was carried out to 30° C. or below on an ice bath in order to stop the polymerization. 200 mass parts of the solvent was then distilled out under reduced pressure, and methanol was subsequently added dropwise while stirring to induce precipitation. The resulting precipitate was filtered off and subsequently washed with pure water, followed by drying to obtain the thermoplastic resin a1. Thermoplastic resin a1 is reported in Table 1.

Thermoplastic Resins a2 to a5 and b1 to b3 Production Example

Thermoplastic resins a2 to a5 and b1 to b3 were obtained proceeding as in the Thermoplastic Resin a1 Production Example, but changing the formulation in the Thermoplastic Resin a1 Production Example as indicated in Table 1. The resulting thermoplastic resins are reported in Table 1.

TABLE 1

|  |  | Thermoplastic resin a1 | Thermoplastic resin a2 | Thermoplastic resin a3 | Thermoplastic resin a4 | Thermoplastic resin a5 | Thermoplastic resin b1 | Thermoplastic resin b2 | Thermoplastic resin b3 |
|---|---|---|---|---|---|---|---|---|---|
| Resin properties | Number-average molecular weight Mn | 18000 | 16000 | 19000 | 18000 | 17000 | 17000 | 16000 | 17000 |
|  | Weight-average molecular weight Mw | 78000 | 75000 | 74000 | 73000 | 76000 | 74000 | 73000 | 75000 |
|  | Peak molecular weight Mp | 32000 | 32000 | 29000 | 32000 | 31000 | 31000 | 32000 | 31000 |
|  | Glass transition temperature (Tg) (° C.) | 51.7 | 60.3 | 52.1 | 51.9 | 61.0 | 54.8 | 56.1 | 51.8 |
|  | Ester group concentration Es (mmol/g) | 1.9 | 1.3 | 2.7 | 3.5 | 0.9 | 3.8 | 4.4 | 5.0 |
| Polymerizable monomer used in synthesis (mass parts) | Styrene | 74.7 | 79.7 | 69.7 | 64.7 | 79.7 | 0.0 | 0.0 | 0.0 |
|  | Phenyl methacrylate | 0.0 | 0.0 | 0.0 | 0.0 | 0.0 | 74.7 | 74.7 | 67.7 |
|  | Ethyl acrylate | 0.0 | 0.0 | 18.0 | 35.0 | 0.0 | 0.0 | 0.0 | 16.0 |
|  | n-butyl acrylate | 25.0 | 15.0 | 12.0 | 0.0 | 0.0 | 0.0 | 25.0 | 16.0 |
|  | 2-ethylhexyl acrylate | 0.0 | 5.0 | 0.0 | 0.0 | 20.0 | 25.0 | 0.0 | 0.0 |
|  | Divinylbenzene | 0.3 | 0.3 | 0.3 | 0.3 | 0.3 | 0.3 | 0.3 | 0.3 |

Thermoplastic Resin c1 Production Example
Ethylene glycol 10 parts (10.0 mol %)
2 mol propylene oxide (PO) adduct on bisphenol A 175 parts (37.8 mol %)
Terephthalic acid 140 parts (52.2 mol %)

These materials were introduced into a 6-liter four-neck flask fitted with a nitrogen introduction line, water separator, stirrer, and thermocouple and a reaction was run in this reactor for 6 hours at 200° C. under a nitrogen atmosphere. This was followed by reaction at 210° C. under pressure reduction to 5 kPa, and the reaction was continued until the weight-average molecular weight (Mw) reached 15,000. The obtained resin is designated thermoplastic resin c1. Thermoplastic resin c1 is reported in Table 2.

Thermoplastic Resins c2 and c3 Production Example
Thermoplastic resins c2 and c3 were obtained proceeding as in the Thermoplastic Resin c1 Production Example, but changing the formulation in the Thermoplastic Resin c1 Production Example as indicated in Table 2. Thermoplastic resins c2 and c3 are reported in Table 2.

TABLE 2

|  |  | Thermoplastic resin c1 | Thermoplastic resin c2 | Thermoplastic resin c2 |
|---|---|---|---|---|
| Resin properties | Number-average molecular weight Mn | 7800 | 14000 | 16000 |
|  | Weight-average molecular weight Mw | 15000 | 29000 | 34000 |
|  | Peak molecular weight Mp | 11000 | 17000 | 19000 |
|  | Glass transition temperature (Tg) (° C.) | 70.5 | 50.7 | 51.0 |
|  | Ester group concentration Es (mmol/g) | 5.01 | 4.72 | 4.40 |
| Polymerizable monomer used in synthesis (mol %) | Ethylene glycol | 10.0 | 10.0 | 10.0 |
|  | 2 mol PO adduct on bisphenol A | 37.8 | 39.0 | 39.0 |
|  | Terephthalic acid | 52.2 | 26.0 | 41.0 |
|  | Dodecenylsuccinic acid | 0.0 | 25.0 | 10.0 |

Powder Adhesive 1 Production Example
The compound 1 given in Table 3 was used for the aromatic compound particle 1 that was used to produce powder adhesive 1.
Toluene: 200 parts
Aromatic compound particle 1: 20.0 parts
Zirconia beads with a diameter of 5 mm: 200 parts
These raw materials were introduced into a wet attritor 1S (Nippon Coke & Engineering Co., Ltd.), and dispersion was carried out for 4 hours at a rotation rate of 1,000 rpm to obtain a dispersion of the aromatic compound particle 1.

TABLE 3

| | | | Nitrogen atom-containing moiety | | N |
|---|---|---|---|---|---|
| Aromatic compound particle 1 | Toner Yellow 3GP (Clariant AG) | Compound 1 | Azo bond | (structure) | 8.4 |
| Aromatic compound particle 2 | Novoperm Yellow 4G (Clariant AG) | | Azo bond | (structure) | 8.4 |
| Aromatic compound particle 3 | Irgalite Yellow L 1257 | Compound 2 | Azo bond | (structure) | 10.4 |
| Aromatic compound particle 4 | PV Fast Yellow HG (Clariant AG) | Compound 3 | Azo bond | (structure) | 13.6 |
| Aromatic compound particle 5 | Fuji Fast Carmine 522 (Fuji Pigment Co., Ltd.) | Compound 4 | Azo bond | (structure) | 9.1 |
| Aromatic compound particle 6 | Toner Magenta E (Clariant AG) | Compound 5 | Heterocycle | (structure) | 5.9 |

TABLE 3-continued

| | | | Nitrogen atom-containing moiety | | N |
|---|---|---|---|---|---|
| Aromatic compound particle 7 | PV Fast Blue BG (Clariant AG) | Compound 6 | Heterocycle | 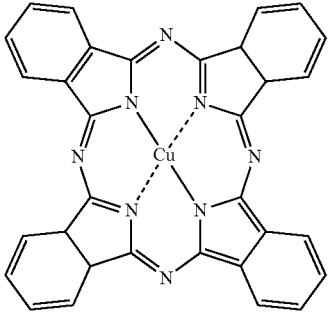 | 13.9 |
| Aromatic compound particle 8 | Irgazin Red L 3550 HD (BASF) | Compound 7 | Heterocycle | 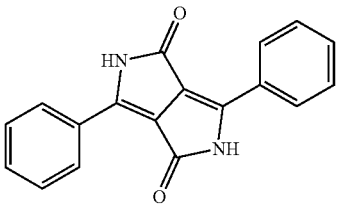 [SMILES: O=C1NC(c2ccccc2)=C2C(=O)NC(c3ccccc3)=C12] | 6.9 |
| Aromatic compound particle 9 | Irgazin Red L 4010 HD (BASF) | Compound 8 | Heterocycle | 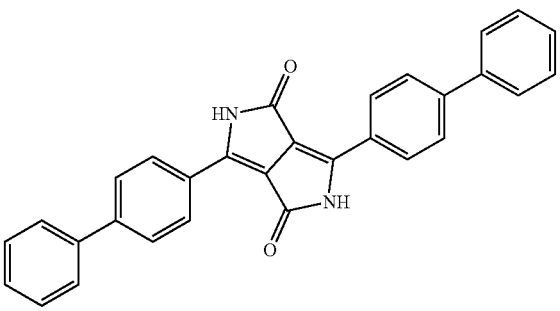 [SMILES: O=C1NC(c2ccc(-c3ccccc3)cc2)=C2C(=O)NC(c3ccc(-c4ccccc4)cc3)=C12] | 4.5 |

In the table, N indicates the nitrogen atom concentration N (mmol/g) in the aromatic compound particle.

Styrene: 74.7 parts n-butyl acrylate: 25.0 parts

Divinylbenzene: 0.3 parts (m- and p-mixture) (contains ethylvinylbenzene and diethylbenzene)

Thermoplastic resin c1: 8.0 parts

Aromatic compound particle 1 dispersion: 0.15 parts (corresponds to aromatic compound particle 1: 0.015 parts)

Wax 1 (ethylene glycol distearate): 12 parts

Wax 2 (Fischer-Tropsch wax: HNP-9 (Nippon Seiro Co., Ltd.)): 3 parts

The preceding materials were held at 65° C. and were dissolved and dispersed to uniformity at 500 rpm using a T. K. Homomixer (Tokushu Kika Kogyo Co., Ltd.) to prepare a polymerizable monomer composition.

14.0 parts of sodium phosphate (dodecahydrate, RASA Industries, Ltd.) was then introduced into 650.0 parts of deionized water in a reactor fitted with a stirrer, thermometer, and reflux condenser, and this was held for 1.0 hour at 65° C. while purging with nitrogen.

An aqueous calcium chloride solution of 9.2 parts of calcium chloride (dihydrate) dissolved in 10.0 parts of deionized water was introduced all at once while stirring at 15,000 rpm using a T. K. Homomixer (Tokushu Kika Kogyo Co., Ltd.) to prepare an aqueous medium containing a dispersion stabilizer. 10 mass % hydrochloric acid was introduced into the aqueous medium to adjust the pH to 5.0, thus yielding an aqueous medium.

While holding the temperature of the obtained aqueous medium at 70° C. and the rotation rate of the T. K. Homomixer at 15,000 rpm, the polymerizable monomer composition was introduced into the aqueous medium and 10.0 parts of the polymerization initiator t-butyl peroxypivalate was added. Granulation was performed for 10 minutes while maintaining 15,000 rpm with the stirrer.

After the granulation step, the stirrer was changed over to a propeller impeller and polymerization was carried out for 5.0 hours while maintaining 70° C. and stirring at 150 rpm. The temperature was then raised to 85° C. and the polymerization reaction was run for 2.0 hours while heating. The reflux condenser on the reactor was subsequently changed over to a cooling condenser, and distillation was performed for 6 hours by heating the slurry to 100° C., thereby distilling off the unreacted polymerizable monomer and yielding a powder adhesive 1 dispersion.

The pH was adjusted to 1.5 or less by the addition of hydrochloric acid to the obtained powder adhesive 1 dispersion and holding was carried out for 1 hour while stirring; this was followed by solid-liquid separation on a pressure filter to obtain a cake of powder adhesive 1. This was reslurried with deionized water to prepare another dispersion, followed by solid-liquid separation using the aforementioned filter to obtain a cake of powder adhesive 1. The resulting cake of powder adhesive 1 was dried for 72 hours in a 40° C. thermostatic chamber to yield powder adhesive 1. Powder adhesive 1 is reported in Tables 4-1 and 4-2.

TABLE 4-1

Conditions in powder adhesive production in the examples

| Powder adhesive No. | Production method | Polymerizable monomer | | | Thermoplastic resin | | Aromatic compound | | | Wax | |
|---|---|---|---|---|---|---|---|---|---|---|---|
| | | Styrene | n-butyl acrylate | Divinyl-benzene | Species | Amount of addition | Species | Nitrogen atom concentration N | Amount of addition | Species | Amount |
| 1 | Suspension polymerization | 74.7 | 25.0 | 0.3 | c1 | 8 | Aromatic compound particle 1 | 8.4 | 0.015 | EG18/HNP9 | 12/3 |
| 2 | Suspension polymerization | 74.7 | 25.0 | 0.3 | c1 | 8 | Aromatic compound particle 1 | 8.4 | 0.015 | EG18 | 12 |
| 3 | Suspension polymerization | 74.7 | 25.0 | 0.3 | c1 | 8 | Aromatic compound particle 1 | 8.4 | 0.015 | EG18/HNP9 | 12/5 |
| 4 | Suspension polymerization | 74.7 | 25.0 | 0.3 | c1 | 8 | Aromatic compound particle 1 | 8.4 | 0.015 | EG18/HNP9 | 20/3 |
| 5 | Suspension polymerization | 74.7 | 25.0 | 0.3 | c1 | 8 | Aromatic compound particle 1 | 8.4 | 0.015 | EG18/HNP9 | 25/3 |
| 6 | Suspension polymerization | 74.7 | 25.0 | 0.3 | c1 | 8 | Aromatic compound particle 1 | 8.4 | 0.015 | EG18 | 25 |
| 7 | Suspension polymerization | 74.7 | 25.0 | 0.3 | c1 | 8 | Aromatic compound particle 1 | 8.4 | 0.015 | HD18/HNP9 | 12/3 |
| 8 | Suspension polymerization | 74.7 | 25.0 | 0.3 | c1 | 8 | Aromatic compound particle 1 | 8.4 | 0.015 | | |
| 9 | Suspension polymerization | 74.7 | 25.0 | 0.3 | c1 | 25 | Aromatic compound particle 1 | 8.4 | 0.015 | | |
| 10 | Suspension polymerization | 74.7 | 25.0 | 0.3 | c1 | 33 | Aromatic compound particle 1 | 8.4 | 0.015 | | |
| 11 | Melt-kneading/pulverization | | | | a3 | 100 | Aromatic compound particle 3 | 10.4 | 0.0500 | EG18/HNP9 | 12/3 |
| 12 | Melt-kneading/pulverization | | | | a1/c3 | 75/25 | Aromatic compound particle 3 | 10.4 | 0.0500 | EG18/HNP9 | 12/3 |
| 13 | Melt-kneading/pulverization | | | | a1/c3 | 50/50 | Aromatic compound particle 3 | 10.4 | 0.0500 | EG18/HNP9 | 12/3 |
| 14 | Melt-kneading/pulverization | | | | a2 | 100 | Aromatic compound particle 1 | 8.4 | 0.0150 | EG18/HNP9 | 12/3 |
| 15 | Melt-kneading/pulverization | | | | a1 | 100 | Aromatic compound particle 1 | 8.4 | 0.0150 | EG18/HNP9 | 12/3 |
| 16 | Melt-kneading/pulverization | | | | a3 | 100 | Aromatic compound particle 1 | 8.4 | 0.0150 | EG18/HNP9 | 12/3 |
| 17 | Melt-kneading/pulverization | | | | a4 | 100 | Aromatic compound particle 1 | 8.4 | 0.0150 | EG18/HNP9 | 12/3 |
| 18 | Melt-kneading/pulverization | | | | a1 | 100 | Aromatic compound particle 1 | 8.4 | 0.0150 | | |
| 19 | Melt-kneading/pulverization | | | | b1 | 100 | Aromatic compound particle 1 | 8.4 | 0.0150 | | |
| 20 | Melt-kneading/pulverization | | | | b2 | 100 | Aromatic compound particle 1 | 8.4 | 0.0500 | | |
| 21 | Melt-kneading/pulverization | | | | b2 | 100 | Aromatic compound particle 3 | 10.4 | 0.0500 | | |
| 22 | Melt-kneading/pulverization | | | | c3 | 100 | Aromatic compound particle 1 | 8.4 | 0.0500 | | |
| 23 | Melt-kneading/pulverization | | | | a3 | 100 | Aromatic compound particle 4 | 13.7 | 0.0500 | EG18/HNP9 | 12/3 |
| 24 | Melt-kneading/pulverization | | | | a3 | 100 | Aromatic compound particle 5 | 9.1 | 0.0500 | EG18/HNP9 | 12/3 |
| 25 | Melt-kneading/pulverization | | | | a3 | 100 | Aromatic compound particle 8 | 6.9 | 0.0500 | EG18/HNP9 | 12/3 |
| 26 | Melt-kneading/pulverization | | | | a3 | 100 | Aromatic compound particle 6 | 5.9 | 0.0500 | EG18/HNP9 | 12/3 |
| 27 | Melt-kneading/pulverization | | | | a3 | 100 | Aromatic compound particle 7 | 13.9 | 0.0500 | EG18/HNP9 | 12/3 |
| 28 | Melt-kneading/pulverization | | | | a3 | 100 | Aromatic compound particle 7 | 13.9 | 0.0300 | EG18/HNP9 | 12/3 |
| 29 | Melt-kneading/pulverization | | | | a3 | 100 | Aromatic compound particle 1 | 8.4 | 1.0000 | | |
| 30 | Melt-kneading/pulverization | | | | a3 | 100 | Aromatic compound particle 1 | 8.4 | 0.7500 | | |
| 31 | Melt-kneading/pulverization | | | | a3 | 100 | Aromatic compound particle 1 | 8.4 | 0.5000 | | |

TABLE 4-1-continued

Conditions in powder adhesive production in the examples

| Powder adhesive No. | Production method | Polymerizable monomer Styrene | n-butyl acrylate | Divinyl-benzene | Thermoplastic resin Species | Amount of addition | Aromatic compound Species | Nitrogen atom concentration N | Amount of addition | Wax Species | Amount |
|---|---|---|---|---|---|---|---|---|---|---|---|
| 32 | Melt-kneading/pulverization | | | | a3 | 100 | Aromatic compound particle 1 | 8.4 | 0.3000 | | |
| 33 | Melt-kneading/pulverization | | | | a3 | 100 | Aromatic compound particle 1 | 8.4 | 0.1000 | | |
| 34 | Melt-kneading/pulverization | | | | a3 | 100 | Aromatic compound particle 1 | 8.4 | 0.0500 | | |
| 35 | Melt-kneading/pulverization | | | | a3 | 100 | Aromatic compound particle 1 | 8.4 | 0.0200 | | |
| 36 | Melt-kneading/pulverization | | | | a3 | 100 | Aromatic compound particle 1 | 8.4 | 0.0075 | | |
| 37 | Melt-kneading/pulverization | | | | a3 | 100 | Aromatic compound particle 1 | 8.4 | 0.0050 | | |
| 38 | Melt-kneading/pulverization | | | | a3 | 100 | Aromatic compound particle 1 | 8.4 | 0.0030 | | |
| 39 | Melt-kneading/pulverization | | | | a3 | 100 | Aromatic compound particle 1 | 8.4 | 0.0010 | | |
| 40 | Melt-kneading/pulverization | | | | a3 | 100 | Aromatic compound particle 2 | 8.4 | 0.0500 | | |
| 41 | Melt-kneading/pulverization | | | | a3 | 100 | Aromatic compound particle 2 | 8.4 | 0.0500 | | |
| Comparative1 | Melt-kneading/pulverization | | | | a3 | 100 | Aromatic compound particle 1 | 8.4 | 0.0001 | EG18/HNP9 | 12/3 |
| Comparative2 | Melt-kneading/pulverization | | | | a5 | 100 | Aromatic compound particle 1 | 8.4 | 0.0150 | | |
| Comparative3 | Melt-kneading/pulverization | | | | b3 | 100 | Aromatic compound particle 1 | 8.4 | 0.0150 | | |
| Comparative4 | Melt-kneading/pulverization | | | | c2 | 100 | Aromatic compound particle 1 | 8.4 | 0.0150 | | |
| Comparative5 | Melt-kneading/pulverization | | | | a3 | 100 | Aromatic compound particle 1 | 8.4 | 1.5000 | EG18/HNP9 | 12/3 |
| Comparative6 | Melt-kneading/pulverization | | | | a3 | 100 | Aromatic compound particle 1 | 8.4 | 1.5000 | EG18/HNP9 | 12/3 |
| Comparative7 | Melt-kneading/pulverization | | | | a3 | 100 | Aromatic compound particle 9 | 4.5 | 0.0150 | | |

In the table, the numerical values for the entries for the polymerizable monomer indicate the number of parts of addition. The amount of addition is given in number of parts. The nitrogen atom concentration N refers to the nitrogen atom concentration N (mmol/g) in the aromatic compound particles. For the waxes in the table, EG18 refers to ethylene glycol distearate. HD18 refers to dibehenyl sebacate.

With regard to the designation and amounts of addition for the thermoplastic resins, the entries a1/c3 and 75/25 indicate the use of 75 parts of thermoplastic resin a1 and 25 parts of thermoplastic resin c3. With regard to the designation and amounts for the waxes, the entries EG18/HNP9 and 12/3 indicate the use of 12 parts of EG18 and 3 parts of HNP9.

TABLE 4-2

Results of analysis of the powder adhesives

| Powder adhesive No. | Thermoplastic resin Volume-average particle diameter (D4) | Tg (° C.) | Ester group concentration Es (average) mmol/g | Proportion of polymer from styrenic monomer and alkyl acrylate or alkyl methacrylate (mass %) | Aromatic compound particle Content M (mass %) | Number-average particle diameter D | Es × (D/M) |
|---|---|---|---|---|---|---|---|
| 1 | 7.2 | 52.3 | 2.0 | 93 | $1.1 \times 10^{-2}$ | 65 | $1.1 \times 10^4$ |
| 2 | 7.0 | 51.3 | 2.0 | 93 | $1.2 \times 10^{-2}$ | 65 | $1.1 \times 10^4$ |
| 3 | 7.0 | 52.2 | 2.0 | 93 | $1.2 \times 10^{-2}$ | 65 | $1.1 \times 10^4$ |
| 4 | 7.0 | 50.3 | 2.0 | 93 | $1.0 \times 10^{-2}$ | 65 | $1.3 \times 10^4$ |
| 5 | 7.2 | 48.8 | 2.0 | 93 | $1.0 \times 10^{-2}$ | 65 | $1.3 \times 10^4$ |
| 6 | 7.1 | 47.9 | 2.0 | 93 | $9.9 \times 10^{-3}$ | 65 | $1.3 \times 10^4$ |

TABLE 4-2-continued

Results of analysis of the powder adhesives

| Powder adhesive No. | Thermoplastic resin | | | | Aromatic compound particle | | |
|---|---|---|---|---|---|---|---|
| | Volume-average particle diameter (D4) | Tg (° C.) | Ester group concentration Es (average) mmol/g | Proportion of polymer from styrenic monomer and alkyl acrylate or alkyl methacrylate (mass %) | Content M (mass %) | Number-average particle diameter D | Es × (D/M) |
| 7 | 7.1 | 51.1 | 2.0 | 93 | $1.2 \times 10^{-2}$ | 65 | $1.1 \times 10^4$ |
| 8 | 7.1 | 54.1 | 2.0 | 93 | $1.3 \times 10^{-2}$ | 65 | $1.0 \times 10^4$ |
| 9 | 7.0 | 56.3 | 2.4 | 80 | $1.1 \times 10^{-2}$ | 65 | $1.5 \times 10^4$ |
| 10 | 7.2 | 59.3 | 2.6 | 75 | $1.0 \times 10^{-2}$ | 65 | $1.6 \times 10^4$ |
| 11 | 7.1 | 47.5 | 2.7 | 100 | $4.3 \times 10^{-2}$ | 90 | $5.8 \times 10^3$ |
| 12 | 7.2 | 51.4 | 2.5 | 75 | $4.2 \times 10^{-2}$ | 80 | $4.7 \times 10^3$ |
| 13 | 7.4 | 51.2 | 3.1 | 50 | $4.2 \times 10^{-2}$ | 75 | $5.6 \times 10^3$ |
| 14 | 7.5 | 55.3 | 1.3 | 100 | $1.2 \times 10^{-2}$ | 55 | $6.1 \times 10^3$ |
| 15 | 7.3 | 46.5 | 1.9 | 100 | $1.2 \times 10^{-2}$ | 40 | $6.3 \times 10^3$ |
| 16 | 7.2 | 47.3 | 2.7 | 100 | $1.3 \times 10^{-2}$ | 35 | $7.5 \times 10^3$ |
| 17 | 7.2 | 47.2 | 3.5 | 100 | $1.2 \times 10^{-2}$ | 25 | $7.2 \times 10^3$ |
| 18 | 7.1 | 51.7 | 1.9 | 100 | $1.5 \times 10^{-2}$ | 40 | $5.1 \times 10^3$ |
| 19 | 7.4 | 54.8 | 3.8 | — | $1.4 \times 10^{-2}$ | 40 | $6.6 \times 10^3$ |
| 20 | 7.5 | 56 | 4.4 | — | $4.9 \times 10^{-2}$ | 40 | $2.3 \times 10^3$ |
| 21 | 7.4 | 51.7 | 4.4 | — | $5.0 \times 10^{-2}$ | 120 | $1.1 \times 10^3$ |
| 22 | 7.4 | 51.1 | 4.4 | — | $4.9 \times 10^{-2}$ | 40 | $2.2 \times 10^3$ |
| 23 | 7.3 | 47.3 | 2.7 | 100 | $4.3 \times 10^{-2}$ | 120 | $7.6 \times 10^3$ |
| 24 | 7.1 | 47.2 | 2.7 | 100 | $4.3 \times 10^{-2}$ | 150 | $8.3 \times 10^3$ |
| 25 | 7.1 | 47.3 | 2.7 | 100 | $4.3 \times 10^{-2}$ | 160 | $9.0 \times 10^3$ |
| 26 | 7.3 | 47.2 | 2.7 | 100 | $4.2 \times 10^{-2}$ | 150 | $8.4 \times 10^3$ |
| 27 | 7.1 | 47.3 | 2.7 | 100 | $4.3 \times 10^{-2}$ | 80 | $5.1 \times 10^3$ |
| 28 | 7.2 | 47.2 | 2.7 | 100 | $2.6 \times 10^{-2}$ | 80 | $8.5 \times 10^3$ |
| 29 | 7.4 | 47.3 | 2.7 | 100 | $8.7 \times 10^{-1}$ | 40 | $1.3 \times 10^2$ |
| 30 | 7.1 | 47.2 | 2.7 | 100 | $6.5 \times 10^{-1}$ | 40 | $1.7 \times 10^2$ |
| 31 | 7.4 | 47.3 | 2.7 | 100 | $4.4 \times 10^{-1}$ | 40 | $2.5 \times 10^2$ |
| 32 | 7.2 | 47.2 | 2.7 | 100 | $2.6 \times 10^{-1}$ | 40 | $4.2 \times 10^2$ |
| 33 | 7.4 | 47.2 | 2.7 | 100 | $1.0 \times 10^{-1}$ | 40 | $1.1 \times 10^3$ |
| 34 | 7.5 | 47.3 | 2.7 | 100 | $4.9 \times 10^{-2}$ | 40 | $2.2 \times 10^3$ |
| 35 | 7.4 | 51.7 | 2.7 | 100 | $2.0 \times 10^{-2}$ | 40 | $5.5 \times 10^3$ |
| 36 | 7.1 | 51.6 | 2.7 | 100 | $7.0 \times 10^{-3}$ | 40 | $1.6 \times 10^4$ |
| 37 | 7.1 | 51.7 | 2.7 | 100 | $4.5 \times 10^{-3}$ | 40 | $2.4 \times 10^4$ |
| 38 | 7.4 | 51.7 | 2.7 | 100 | $2.4 \times 10^{-3}$ | 40 | $4.6 \times 10^4$ |
| 39 | 7.5 | 51.8 | 2.7 | 100 | $1.9 \times 10^{-4}$ | 40 | $5.9 \times 10^5$ |
| 40 | 7.4 | 51.9 | 2.7 | 100 | $4.9 \times 10^{-2}$ | 180 | $1.0 \times 10^4$ |
| 41 | 7.2 | 52 | 2.7 | 100 | $4.9 \times 10^{-2}$ | 250 | $1.4 \times 10^4$ |
| Comparative1 | 7.3 | 47.5 | 2.7 | 100 | $1.1 \times 10^{-5}$ | 40 | $1.1 \times 10^7$ |
| Comparative2 | 7.3 | 60.9 | 0.9 | 100 | $1.0 \times 10^{-1}$ | 40 | $3.6 \times 10^2$ |
| Comparative3 | 7.1 | 51.7 | 5.0 | — | $1.0 \times 10^{-1}$ | 40 | $2.0 \times 10^3$ |
| Comparative4 | 7.4 | 50.6 | 4.7 | — | $1.2 \times 10^{-1}$ | 40 | $1.6 \times 10^3$ |
| Comparative5 | 7.2 | 47.7 | 2.7 | 100 | $1.5 \times 10^0$ | 40 | $7.3 \times 10^1$ |
| Comparative6 | 7.3 | 47.6 | 2.7 | 100 | $1.5 \times 10^0$ | 180 | $3.3 \times 10^2$ |
| Comparative7 | 7.3 | 51.1 | 2.7 | 100 | $1.0 \times 10^{-2}$ | 150 | $3.5 \times 10^4$ |

Powder Adhesives 2 to 10 Production Example

Powder adhesives 2 to 10 were produced proceeding as in the Powder Adhesive 1 Production Example, but changing the formulation in the Powder Adhesive 1 Production Example as shown in Table 4-1. The properties are shown in Table 4-2.

Powder Adhesive 11 Production Example

Thermoplastic resin a1: 100 parts

Aromatic compound particle 1 dispersion: 0.15 parts (corresponds to aromatic compound particle 1: 0.0150 parts)

These materials were pre-mixed using a Henschel mixer (Nippon Coke & Engineering Co., Ltd.) followed by melt-kneading with a twin-screw kneading extruder (Model PCM-30, Ikegai Ironworks Corporation). The resulting kneaded material was cooled and coarsely pulverized using a hammer mill and was then pulverized using a mechanical pulverizer (T-250, Turbo Kogyo Co., Ltd.). The resulting finely pulverized powder was classified using a Coanda effect-based multi-grade classifier to yield powder adhesive 11. Powder adhesive 11 is reported in Table 4-2.

Powder Adhesives 12 to 40 and Comparative Powder Adhesives 1 to 9 Production Example Powder adhesives 12 to 40 and comparative powder adhesives 1 to 9 were produced proceeding as in the Powder Adhesive 11 Production Example, but changing the formulation in the Powder Adhesive 11 Production Example as shown in Table 4-1. The properties are shown in Table 4-2.

Powder Adhesive 41 Production Example

Powder adhesive 41 was produced proceeding as in the Powder Adhesive 11 Production Example, with the following exceptions: the dispersion for 4 hours in the production of the dispersion of the aromatic compound particles using the wet attritor 1S in the Powder Adhesive 11 Production Example, was changed to dispersion for 1.5 hours; and the formulation was changed as indicated in Table 4-1. Powder adhesive 41 is reported in Table 4-2.

Example 1

Powder adhesive 1 was evaluated using the following evaluation procedures.

Adhesive Performance Tests

Preparation of Coating Fluid of the Powder Adhesive Undergoing Evaluation

A dispersion of the powder adhesive 1 undergoing evaluation was prepared by introducing 30 parts of the powder adhesive under evaluation into 70 parts of methanol and carrying out a dispersion treatment for 30 minutes using an ultrasound cleaner.

Preparation of Evaluation Samples

Figure 2:
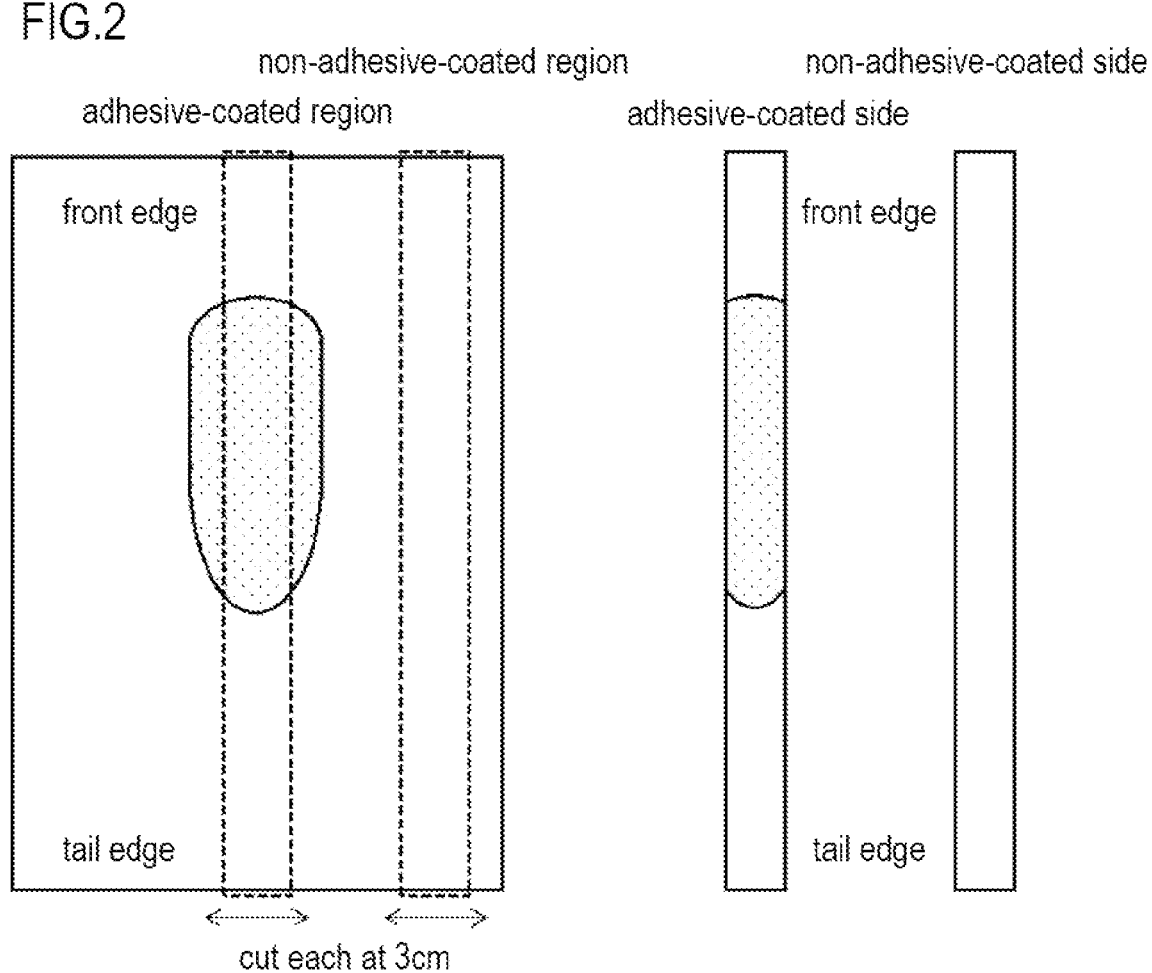
FIG. 2 is a schematic diagram of an evaluation sample.
Figure 3:
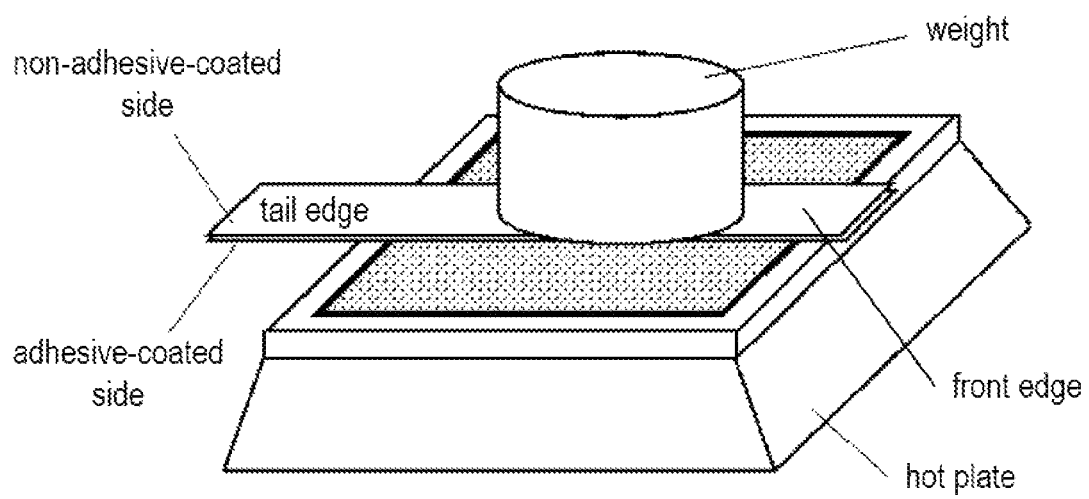
FIG. 3 is a schematic diagram of an evaluation sample.

Using the bar coating method shown in FIG. 1, the coating fluid of the powder adhesive undergoing evaluation was coated using a No. 15 bar coater on the evaluation paper, and a powder adhesive-coated region was formed by thoroughly drying. Then, the adhesive-coated side and the non-adhesive-coated side were cut to 3 cm widths as shown in FIG. 2. The evaluation paper with the adhesive-coated side and the evaluation paper with the non-adhesive-coated side were stacked on each other as shown in FIG. 3, with the powder adhesive-coated side to the inside. This was followed by placement, with the evaluation paper with the powder adhesive-coated side on the bottom, on a hot plate heated to 130° C., and a 100 g weight was also placed thereon. Everything was removed from the hot plate after 10 seconds, thus yielding the evaluation sample.

With regard to the evaluation paper, an evaluation sample was fabricated using GF-0081 High Whiteness Paper (Canon, Inc.) in a test A, and an evaluation sample was fabricated using Image Coat Gloss 100 (Canon, Inc.) in a test B. Ten evaluation samples were fabricated in each case.

Evaluation of Adhesive Strength

Figure 4:
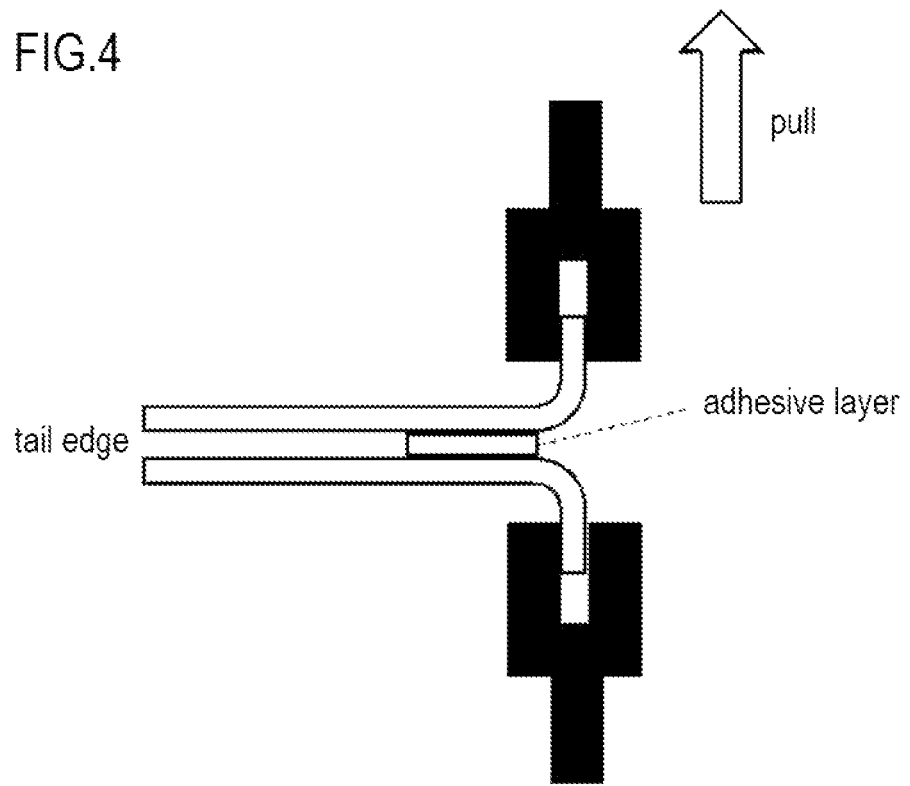
FIG. 4 is a schematic diagram of an evaluation of adhesive strength.

A Tensilon RTG-1225 (A & D Company, Limited) universal tester was used to evaluate the adhesive strength. Parallel tightening jaws were used for the tools, and the laminated sample was installed as shown in FIG. 4. A graph having distance (mm) on the horizontal axis and stress (N/cm$^2$) on the vertical axis was obtained by peeling the sample image undergoing evaluation using a condition of 50 mm/min, and the stress per 1 cm of width obtained by multiplying the maximum value in this graph by ⅓ was taken to be the adhesive strength (N/cm$^2$). A larger value for this is indicative of a better adhesive strength.

Evaluation of the Adhesive Strength Difference

The adhesive strength was tested respectively using the evaluation samples for test A and test B. The difference between the average value of the ten results in the evaluation used in test A and the average value of the ten results in the evaluation used in test B was calculated. A smaller absolute value for the difference between the results of the evaluations indicates the absence of a difference in the adhesive strength and is a better result.

Coloration Test

The evaluation was carried out by measuring the density, from above the paper surface, at the location bonded by the powder adhesive during the fabrication of the test A sample in the adhesive performance tests. The density measurements were carried out using an X-rite exact advance (X-rite, Incorporated), and the evaluation was carried out using the average value for the ten test samples. A smaller density value is indicative of less coloration and a better powder adhesive.

Storability Test

Preparation of the Sample for Evaluation of the Storability 5.0 g of the powder adhesive undergoing evaluation was introduced into a plastic cup; two of these were prepared. A thermal history was applied to one by holding for 48 hours in a thermostatic chamber at 45° C./95%. Each sample was then conditioned for 24 hours in a 23° C./40% atmosphere to provide the storability evaluation samples.

Evaluation of Storability

The storability was evaluated using a powder tester. A 100-mesh sieve was prepared; the sample for evaluation of the storability was loaded thereon; vibration was applied for 30 seconds at a vibration value of 0.70 mm/sec; and the mass of the remaining powder adhesive was measured.

The increment in the mass remaining on the sieve for the evaluation sample that had received a thermal history was evaluated as the mass % using as reference the mass remaining on the sieve for the storability evaluation sample that had not received a thermal history. The case of no change is 100 mass %, and the storability is better the nearer to 100 mass %. The evaluation result for the powder adhesive 1 is given in Table 5.

TABLE 5

| | Powder adhesive No. | Adhesiveness tests | | | Coloration test (density) | Storability test (mass %) |
|---|---|---|---|---|---|---|
| | | Test paper A | Test paper B | Test paper A − Test paperB | | |
| Example 1 | 1 | 1.81 | 1.80 | 0.01 | 0.01 | 80 |
| Example 2 | 2 | 1.80 | 1.80 | 0.00 | 0.02 | 71 |
| Example 3 | 3 | 1.82 | 1.78 | 0.04 | 0.01 | 74 |
| Example 4 | 4 | 1.83 | 1.75 | 0.08 | 0.00 | 72 |
| Example 5 | 5 | 1.83 | 1.71 | 0.12 | 0.00 | 68 |
| Example 6 | 6 | 1.81 | 1.70 | 0.11 | 0.00 | 58 |
| Example 7 | 7 | 1.75 | 1.76 | −0.01 | 0.01 | 74 |
| Example 8 | 8 | 1.71 | 1.67 | 0.04 | 0.01 | 84 |
| Example 9 | 9 | 1.71 | 1.62 | 0.09 | 0.01 | 78 |
| Example 10 | 10 | 1.65 | 1.54 | 0.11 | 0.00 | 75 |
| Example 11 | 11 | 1.71 | 1.68 | 0.03 | 0.03 | 56 |
| Example 12 | 12 | 1.65 | 1.71 | −0.06 | 0.03 | 51 |
| Example 13 | 13 | 1.60 | 1.52 | 0.08 | 0.04 | 35 |
| Example 14 | 14 | 1.58 | 1.73 | −0.15 | 0.01 | 54 |
| Example 15 | 15 | 1.76 | 1.72 | 0.04 | 0.00 | 45 |
| Example 16 | 16 | 1.76 | 1.72 | 0.04 | 0.01 | 45 |
| Example 17 | 17 | 1.72 | 1.66 | 0.06 | 0.01 | 46 |
| Example 18 | 18 | 1.72 | 1.68 | 0.04 | 0.02 | 54 |

TABLE 5-continued

|  | Powder adhesive No. | Adhesiveness tests | | | Coloration test (density) | Storability test (mass %) |
|---|---|---|---|---|---|---|
|  |  | Test paper A | Test paper B | Test paper A – Test paperB |  |  |
| Example 19 | 19 | 1.55 | 1.46 | 0.09 | 0.02 | 43 |
| Example 20 | 20 | 1.54 | 1.40 | 0.14 | 0.02 | 40 |
| Example 21 | 21 | 1.54 | 1.41 | 0.13 | 0.02 | 41 |
| Example 22 | 22 | 1.55 | 1.38 | 0.17 | 0.03 | 42 |
| Example 23 | 23 | 1.79 | 1.78 | 0.01 | 0.02 | 46 |
| Example 24 | 24 | 1.78 | 1.70 | 0.08 | 0.10 | 47 |
| Example 25 | 25 | 1.77 | 1.63 | 0.14 | 0.11 | 45 |
| Example 26 | 26 | 1.78 | 1.55 | 0.23 | 0.10 | 44 |
| Example 27 | 27 | 1.79 | 1.56 | 0.23 | 0.10 | 46 |
| Example 28 | 28 | 1.75 | 1.49 | 0.26 | 0.08 | 47 |
| Example 29 | 29 | 1.51 | 1.21 | 0.30 | 0.14 | 45 |
| Example 30 | 30 | 1.52 | 1.32 | 0.20 | 0.11 | 47 |
| Example 31 | 31 | 1.53 | 1.38 | 0.15 | 0.08 | 47 |
| Example 32 | 32 | 1.57 | 1.48 | 0.09 | 0.06 | 46 |
| Example 33 | 33 | 1.66 | 1.61 | 0.05 | 0.03 | 43 |
| Example 34 | 34 | 1.70 | 1.66 | 0.04 | 0.02 | 44 |
| Example 35 | 35 | 1.71 | 1.68 | 0.03 | 0.01 | 52 |
| Example 36 | 36 | 1.69 | 1.67 | 0.02 | 0.00 | 53 |
| Example 37 | 37 | 1.66 | 1.64 | 0.02 | 0.00 | 52 |
| Example 38 | 38 | 1.55 | 1.51 | 0.04 | 0.00 | 54 |
| Example 39 | 39 | 1.49 | 1.28 | 0.21 | 0.00 | 53 |
| Example 40 | 40 | 1.63 | 1.51 | 0.12 | 0.03 | 52 |
| Example 41 | 41 | 1.58 | 1.37 | 0.21 | 0.03 | 53 |
| Comparative Example 1 | Comparative 1 | 1.45 | 1.03 | 0.42 | 0.00 | 47 |
| Comparative Example 2 | Comparative 2 | 1.33 | 1.73 | −0.40 | 0.03 | 59 |
| Comparative Example 3 | Comparative 3 | 1.59 | 1.13 | 0.46 | 0.04 | 38 |
| Comparative Example 4 | Comparative 4 | 1.61 | 1.14 | 0.47 | 0.05 | 32 |
| Comparative Example 5 | Comparative 5 | 1.35 | 0.93 | 0.42 | 0.21 | 45 |
| Comparative Example 6 | Comparative 6 | 1.41 | 0.94 | 0.47 | 0.22 | 44 |
| Comparative Example 7 | Comparative 7 | 1.61 | 1.18 | 0.43 | 0.09 | 52 |

The numerical values for the adhesiveness tests are the adhesive strength (N/cm²) per 1 cm of width of the sample being evaluated.

Examples 2 to 41 and Comparative Examples 1 to 7

Proceeding as in Example 1, the evaluations indicated in Table 5 were carried out in Examples 2 to 41 and Comparative Examples 1 to 7. The results of the evaluations are given in Table 5.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-130488, filed Jul. 31, 2020, which is hereby incorporated by reference herein in its entirety.

What is claimed is:

1. A powder adhesive comprising:
a thermoplastic resin; and
a particle comprising an aromatic compound,
wherein the aromatic compound is a compound comprising an aromatic ring and an azo bond bonded to the aromatic ring, or a compound comprising a heteroaromatic ring comprising a nitrogen atom,
wherein the thermoplastic resin comprises an ester group, and
wherein, designating Es (mmol/g) as an ester group concentration in the thermoplastic resin, M (mass %) as a content of the aromatic compound particles in the powder adhesive, and N (mmol/g) as a nitrogen atom concentration in the aromatic compound particles,
Es is 1.0 to 4.5 mmol/g,
M is $1.0 \times 10^{-4}$ to $5.0 \times 10^{-2}$ mass %, and
N is 5.0 to 15.0 mmol/g.

2. The powder adhesive according to claim 1, wherein Es, M, and D satisfy formula (1), where D (nm) is a number-average particle diameter of the particle:

$$1.0 \times 10^3 \leq Es \times (D/M) \leq 3.0 \times 10^4 \qquad (1).$$

3. The powder adhesive according to claim 1, wherein D is 30 to 200 nm where D (nm) is a number-average particle diameter of the particle.

4. The powder adhesive according to claim 1, wherein the aromatic compound is the compound comprising the aromatic ring and the azo bond bonded to the aromatic ring.

5. The powder adhesive according to claim 4, wherein the aromatic compound is a compound comprising a structure represented by following formula (4) below:

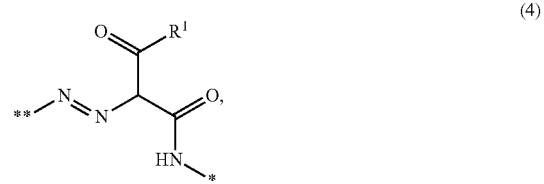

(4)

where, in the formula (4),

R¹ represents an alkyl group having 1 to 3 carbon atoms, and,

* and ** represent sites of bonding to aromatic rings present in the compound.

6. The powder adhesive according to claim 5, wherein the compound comprising the structure represented by the formula (4) is a pigment.

7. The powder adhesive according to claim 1, wherein the thermoplastic resin comprises a copolymer of monomers comprising:
a styrenic polymerizable monomer, and
at least one selected from the group consisting of acrylate esters and methacrylate esters.

8. The powder adhesive according to claim 7, wherein a content of the copolymer in the thermoplastic resin is 70 to 100 mass %.

9. The powder adhesive according to claim 1, wherein the aromatic compound is at least one selected from the group consisting of C. I. Pigment Yellow 74, C. I. Pigment Yellow 95, C. I. Pigment Yellow 155, and C. I. Pigment Yellow 180.

10. The powder adhesive according to claim 1, wherein the powder adhesive comprises a hydrocarbon wax and an ester wax.

11. The powder adhesive according to claim 1, wherein M is $3.0\text{-}10^{\times 3}$ to $5.0 \times 10^{-2}$ mass %.

12. The powder adhesive according to claim 1, wherein:
a content of the thermoplastic resin in the powder adhesive is 60.00 mass % to 99.99 mass %;
the aromatic compound is a compound selected from the group consisting of a compound comprising a structure represented by formula (4) and compounds 5 to 7:

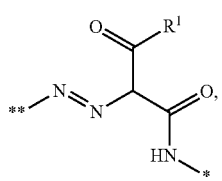

(4)

where, in the formula (4):
R¹ represents an alkyl group having 1 to 3 carbon atoms; and
* and ** represent sites of bonding to aromatic rings present in the compound;

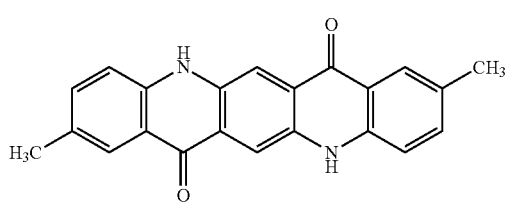

compound 5

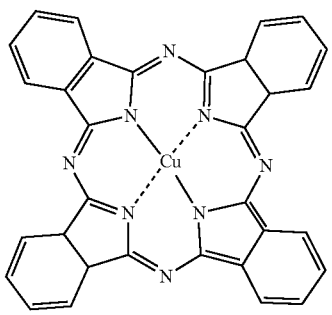

compound 6

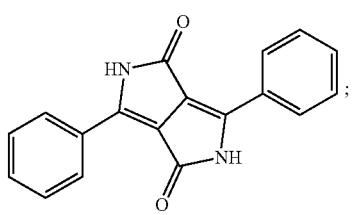

compound 7 the thermoplastic resin comprises a copolymer of monomers comprising:
a styrenic polymerizable monomer; and
at least one selected from the group consisting of acrylate esters and methacrylate esters;
a content of the copolymer in the thermoplastic resin is 70 to 100 mass %; and
D is 30 to 200 nm, where D (nm) is a number-average particle diameter of the particle.

13. A bonded article comprising
an adhesive, and
at least one piece of paper bonded with the adhesive,
wherein the adhesive is a melt-hardened material from a powder adhesive,
the powder adhesive comprises
a thermoplastic resin, and
a particle comprising an aromatic compound,
wherein the aromatic compound is compound comprising an aromatic ring and an azo bond bonded to the aromatic ring, or a compound comprising a heteroaromatic ring comrpising a nitrogen atom,
wherein the thermoplastic resin comprises an ester group, and
wherein, designating Es (mmol/g) as an ester group concentration in the thermoplastic resin, M (mass %) as a content of the aromatic compound particles in the powder adhesive, and N (mmol/g) as a nitrogen atom concentration in the aromatic compound particles,
Es is 1.0 to 4.5 mmol/g,
M is $1.0 \times 10^{-4}$ to $5.0 \times 10^{31\ 2}$ mass %, and
N is 5.0 to 15.0 mmol/g.

14. The bonded article according to claim 13, wherein:
a content of the thermoplastic resin in the powder adhesive is 60.00 mass % to 99.99 mass %;
the aromatic compound is a compound selected from the group consisting of a compound comprising a structure represented by formula (4) and compounds 5 to 7:

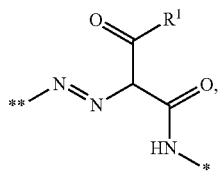
(4)

where, in the formula (4):

$R^1$ represents an alkyl group having 1 to 3 carbon atoms; and

* and ** represent sites of bonding to aromatic rings present in the compound;

compound 5

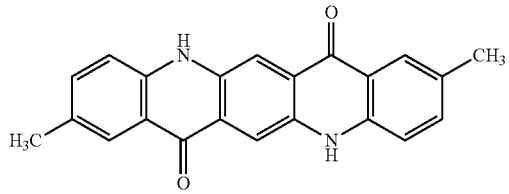

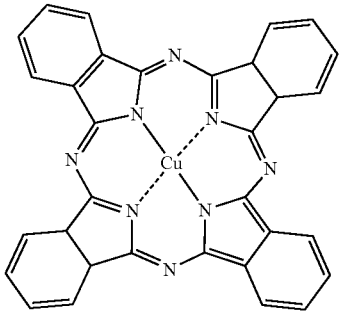

compound 6

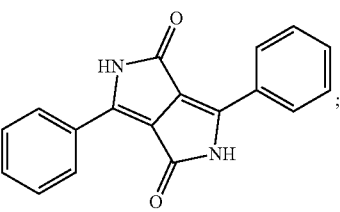

compound 7 the thermoplastic resin comprises a copolymer of monomers comprising:
  a styrenic polymerizable monomer; and
  at least one selected from the group consisting of acrylate esters and methacrylate esters;
a content of the copolymer in the thermoplastic resin is 70 to 100 mass %; and
D is 30 to 200 nm, where D (nm) is a number-average particle diameter of the particle.

* * * * *